United States Patent
Oh et al.

(10) Patent No.: US 8,646,061 B2
(45) Date of Patent: Feb. 4, 2014

(54) METHOD AND APPARATUS FOR TRANSMITTING RIGHTS OBJECT INFORMATION BETWEEN DEVICE AND PORTABLE STORAGE

(75) Inventors: Yun-sang Oh, Seoul (KR); Tae-sung Kim, Seoul (KR); Kyung-im Jung, Seongnam-si (KR); Shin-han Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1264 days.

(21) Appl. No.: 11/140,361

(22) Filed: May 31, 2005

(65) Prior Publication Data

US 2005/0268098 A1    Dec. 1, 2005

Related U.S. Application Data

(60) Provisional application No. 60/575,757, filed on Jun. 1, 2004.

(30) Foreign Application Priority Data

May 31, 2004    (KR) .................. 10-2004-0039377

(51) Int. Cl.
| | |
|---|---|
| *G06F 7/04* | (2006.01) |
| *G06F 15/16* | (2006.01) |
| *G06F 17/30* | (2006.01) |
| G06F 21/00 | (2013.01) |
| G06F 11/30 | (2006.01) |
| G06F 12/14 | (2006.01) |

(52) U.S. Cl.
USPC ................. 726/10; 726/26; 726/27; 713/168; 713/193

(58) Field of Classification Search
USPC ................. 713/168, 193; 726/10, 26, 27
See application file for complete search history.

(56) References Cited

U.S. PATENT DOCUMENTS 5,677,953 A * 10/1997 Dolphin .......................... 705/51
6,195,545 B1 * 2/2001 Baker et al. ................. 455/414.1
6,697,944 B1 * 2/2004 Jones et al. ................... 713/168

(Continued)

FOREIGN PATENT DOCUMENTS

| CN | 1608263 A | 4/2005 |
|---|---|---|
| JP | 2002-73421 A | 3/2002 |

(Continued)

OTHER PUBLICATIONS

Mobile DRM Based on OMA 1.0, Dec. 4, 2003 by DigiCaps Technical Research Center, Seung-heun OH.

(Continued)

*Primary Examiner* — Edan Orgad
*Assistant Examiner* — Kari Schmidt
(74) *Attorney, Agent, or Firm* — Sughrue Mion, PLLC

(57) ABSTRACT

A method and apparatus for transmitting rights object information between a device and a portable storage are provided. The method includes transmitting a predetermined request from the device to the portable storage, generating a current permission status format including information of a rights object designated by the request, using the portable storage, and transmitting the current permission status format from the portable storage to the device. According to the method and apparatus, overhead is reduced and information transmission speed is increased when the rights object information is transmitted between the device and the portable storage.

37 Claims, 16 Drawing Sheets

(56) References Cited

U.S. PATENT DOCUMENTS

| | | | |
|---|---|---|---|
| 6,799,271 B2* | 9/2004 | Kugai | 713/168 |
| 6,931,532 B1* | 8/2005 | Davis et al. | 713/167 |
| 7,010,809 B2* | 3/2006 | Hori et al. | 726/26 |
| 7,073,063 B2* | 7/2006 | Peinado | 713/171 |
| 7,082,536 B2* | 7/2006 | Filipi-Martin et al. | 713/171 |
| 7,263,188 B2* | 8/2007 | Kohno | 380/231 |
| 7,506,367 B1* | 3/2009 | Ishibashi | 726/10 |
| 2002/0077988 A1* | 6/2002 | Sasaki et al. | 705/59 |
| 2002/0099947 A1* | 7/2002 | Evans | 713/193 |
| 2002/0106081 A1* | 8/2002 | Yang | 380/201 |
| 2002/0184515 A1* | 12/2002 | Oho et al. | 713/193 |
| 2003/0005135 A1* | 1/2003 | Inoue et al. | 709/229 |
| 2003/0012224 A1* | 1/2003 | Kawahara et al. | 370/468 |
| 2003/0046567 A1* | 3/2003 | Carman | 713/193 |
| 2003/0120928 A1 | 6/2003 | Cato et al. | |
| 2003/0194093 A1 | 10/2003 | Evans et al. | |
| 2003/0221103 A1* | 11/2003 | Hirota et al. | 713/172 |
| 2004/0025058 A1* | 2/2004 | Kuriya et al. | 713/201 |
| 2004/0098592 A1* | 5/2004 | Taki | 713/176 |
| 2004/0103312 A1* | 5/2004 | Messerges et al. | 713/201 |
| 2005/0004875 A1* | 1/2005 | Kontio et al. | 705/52 |
| 2005/0097595 A1* | 5/2005 | Lipsanen et al. | 725/25 |
| 2005/0187882 A1* | 8/2005 | Sovio et al. | 705/64 |

FOREIGN PATENT DOCUMENTS

| | | | |
|---|---|---|---|
| JP | 2002-330125 A | 11/2002 | |
| JP | 2003-122636 A | 4/2003 | |
| JP | 2003-131751 A | 5/2003 | |
| JP | 2003-233795 A | 8/2003 | |
| JP | 2003-264590 A | 9/2003 | |
| JP | 2003-308249 A | 10/2003 | |
| JP | 2004-46833 A | 2/2004 | |
| KR | 2002-0095726 A | 12/2002 | |
| KR | 2003-0012764 A | 2/2003 | |
| KR | 10-2003-0400947 B1 | 9/2003 | |
| KR | 10-2004-0007621 A | 1/2004 | |
| KR | 10-2004-0007699 A | 1/2004 | |

OTHER PUBLICATIONS

Open Mobile Alliance, OMA—Download-DRMCF-vl-0-20020708-p, Jul. 8, 2002.

Masataka Okayama et. al. "Digital Technology for Rights Management in Content Distribution" Oct. 1, 2002, pp. 17-22.

"Superdistribution and the Security of Music Content" Fujitsu vol. 52, No. 5, Sep. 13, 2001. pp. 473-481.

Tekeaki Anagawa et. al. "Open Superdistribution Infrastructure Realizing the Tenacity of the Content Protection" vol. 1.2001 No. 118, Nov. 30, 2001, pp. 31-42.

Office Action dated May 18, 2010, issued in counterpart Japanese Application No. 2007-513076.

Canadian Office action issued Jul. 21, 2011, in counterpart Canadian Patent Application No. 2,568,088.

Communication issued on Jan. 27, 2012 by the European Patent Office in the counterpart European Patent Application No. 05740788.4.

* cited by examiner

FIG. 3

| | | DESCRIPTION | TYPE |
|---|---|---|---|
| VERSION(300) | | DRM SYSTEM VERSION | 1 BYTE |
| ASSET(320) | ID | ASSET NAME | NOT FIXED |
| | UID | CONTENT URI | URI (256 BYTES) |
| | INHERIT | SUBSCRIPTION ID | NOT FIXED |
| | KEYVALUE | CONTENT ENCRYPTION KEY | 128 BITS |
| | ... | ... | ... |
| PERMISSION (340) | IDREF | NAME OF ID IN ASSET | NOT FIXED |
| | PLAY | CONSTRAINT | CONSTRAINT |
| | DISPLAY | CONSTRAINT | CONSTRAINT |
| | EXECUTE | CONSTRAINT | CONSTRAINT |
| | PRINT | CONSTRAINT | CONSTRAINT |
| | EXPORT MODE | "MOVE" OR "COPY" | 4 BYTES |
| | EXPORT CONSTRAINT | CONSTRAINT | CONSTRAINT |
| | ... | ... | ... |

FIG. 4

| CONSTRAINT | | DESCRIPTION | TYPE |
|---|---|---|---|
| COUNT(400) | | POSITIVE INTEGER | 1 BYTE |
| DATETIME (410) | START | CCYY-MM-DDThh:mm:ss | [ISO8601](19b) |
| | END | CCYY-MM-DDThh:mm:ss | [ISO8601](19b) |
| | DURATION | PnDTnHnMnS | [ISO8601] |
| INTERVAL (420) | START | CCYY-MM-DDThh:mm:ss | [ISO8601](19b) |
| | END | CCYY-MM-DDThh:mm:ss | [ISO8601](19b) |
| ACCUMULATED(430) | | PnDTnHnMnS | [ISO8601](19b) |
| INDIVIDUAL(440) | | URI | 15 BYTES OR 24 BYTES |
| SYSTEM (450) | VERSION | VERSION OF TARGET DRM SYSTEM | 1 BYTE |
| | UID | NAME OF THE TARGET DRM SYSTEM | NOT FIXED |

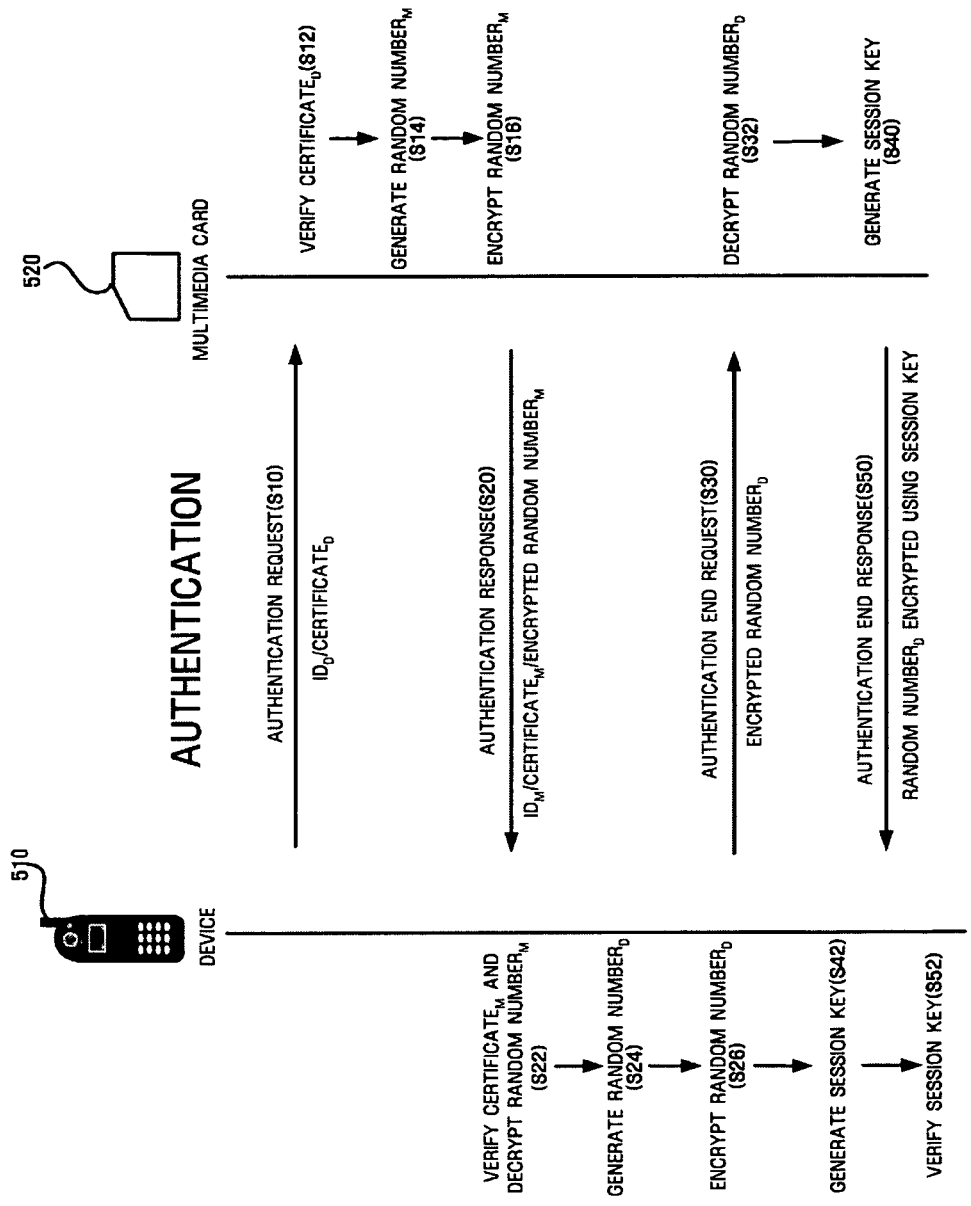

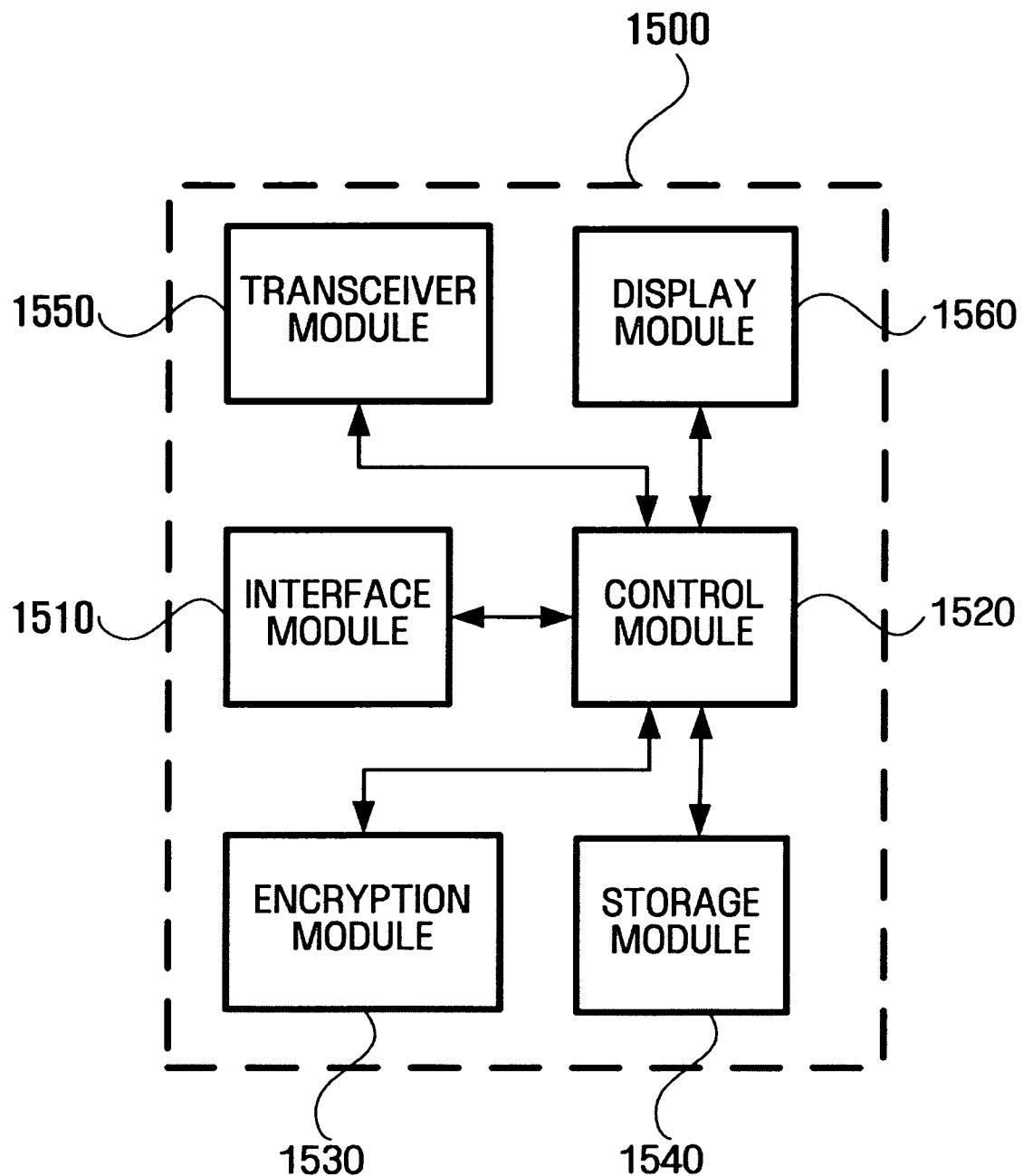

METHOD AND APPARATUS FOR TRANSMITTING RIGHTS OBJECT INFORMATION BETWEEN DEVICE AND PORTABLE STORAGE

CROSS-REFERENCE TO RELATED APPLICATIONS

This application claims priority from Korean Patent Application No. 10-2004-0039377 filed on May 31, 2004 in the Korean Intellectual Property Office, and U.S. Provisional Patent Application No. 60/575,757 filed on Jun. 1, 2004 in the United States Patent and Trademark Office, the disclosures of which is incorporated herein by reference in their entirety.

BACKGROUND OF THE INVENTION

1. Field of the Invention

Apparatuses and methods consistent with the present invention relate to transmission of rights object information, and more particularly, to transmitting rights object information between a device and a portable storage using a current permission status format (CPSF) that includes permission information of a rights object so that overhead is reduced during transmission of rights object information.

2. Description of the Related Art

Recently, digital rights management (DRM) has been actively researched and developed. Some commercial services have already implemented DRM and others plan to. DRM is needed because of the following characteristics of digital content. Unlike analog data, digital content can be copied without loss and can be easily reused, processed, and distributed. However, a large amount of cost, labor, and time are needed to produce digital content. When digital content is copied and distributed without permission, producers lose profits, and motivation to produce is discouraged. As a result, the development of digital content businesses is hampered.

There have been several efforts to protect digital content. Conventionally, digital content protection has concentrated on preventing non-permitted access to digital content, that is, permitting only people who have paid charges to access the digital content. However, when a person who has paid charges intentionally distributes the digital content to other people, they can use the digital content without paying charges. To solve this program, DRM was introduced. In DRM, anyone is allowed to freely access encoded digital content, but a license referred to as a rights object is needed to decode and execute the digital content. Accordingly, the digital content can be more effectively protected by DRM.

The concept of DRM using conventional technology will be described with reference to FIG. 1. DRM relates to management of content (hereafter, referred to as encrypted content) protected using a method such as encryption or scrambling and rights objects allowing use of the encrypted content.

Referring to FIG. 1, a DRM system includes devices 110 and 150, e.g., mobile terminals, wanting to access content protected by DRM, a contents issuer 120 issuing content, a rights issuer 130 issuing a rights object containing a right to access the content, and a certification authority 140 issuing a certificate.

In a DRM system, the device 110 can obtain desired content encrypted from the contents issuer 120. The device 110 can obtain a license to playback the encrypted content from a rights object received from the rights issuer 130. Then, the device 110 can playback the encrypted content. Since encrypted content can be circulated or distributed freely, the device 110 can freely transmit the encrypted content to another device 150.

The device 150 needs the rights object to playback the encrypted content, which can be obtained from the rights issuer 130.

Meanwhile, the certification authority 140 issues a certificate indicating that the contents issuer 120 is authentic and the devices 110 and 150 are proper devices. The certificate may be embedded into devices 110 and 150 when the devices 110 and 150 are manufactured, and it may be reissued by the certification authority 140 after a predetermined period has expired.

In addition to a technique of directly transmitting a rights object or encrypted content between the devices 110 and 150 as shown in FIG. 1, a technique of transmitting a rights object and encrypted content through a portable storage from one device to another device has been suggested recently.

Generally, a portable storage has a lower data storage capacity or data processing speed than a device such a mobile terminal. Therefore, efficient management of data transmission between the device and the portable storage is needed.

SUMMARY OF THE INVENTION

The present invention provides a method and apparatus for transmitting rights object information between a device and a portable storage using a CPSF including permission information of a rights object, thereby reducing overhead and increasing a transmission speed.

According to an aspect of the present invention, there is provided a method of transmitting rights object information between a device and a portable storage. The method includes transmitting a predetermined request from the device to the portable storage, generating a current permission status format including information of a rights object designated by the request, using the portable storage, and transmitting the current permission status format from the portable storage to the device.

According to another aspect of the present invention, there is provided a method of transmitting rights object information between a device and a portable storage, the method including transmitting a predetermined request from the device to the portable storage, and receiving a current permission status format including information of a rights object designated by the request from the portable storage.

According to still another aspect of the present invention, there is provided a portable storage including an interface module connected to a device for communication, a storage module storing a rights object, a control module determining whether to generate a current permission status format according to a request received from the device through the interface module, and a data format generation module searching the storage module to find a rights object designated by the request and generating the current permission status format including information of the rights object according to the result of the determination performed by the control module.

According to yet another aspect of the present invention, there is provided a device including an interface module connected to a portable storage for communication, and a control module generating a predetermined request to be transmitted to the portable storage through the interface module and obtaining information of a rights object designated by the predetermined request from a current permission status format that is received through the interface module in response to the request.

According to another aspect of the present invention, there is provided a non-transitory recording medium having recorded thereon a program for executing the method of transmitting rights object information between a device and a portable storage, which is performed by the portable storage.

According to another aspect of the present invention, there is provided a non-transitory recording medium having recorded thereon a program for executing the method of transmitting rights object information between a device and a portable storage, which is performed by the device.

BRIEF DESCRIPTION OF THE DRAWINGS

The above and other aspects of the present invention will become more apparent by describing in detail exemplary embodiments thereof with reference to the attached drawings in which:

FIG. 3 illustrates the format of a rights object according to an exemplary embodiment of the present invention;

FIG. 4 is a table illustrating types of constraints given to permission shown in FIG. 3;

FIG. 5 illustrates authentication between a device and a multimedia card;

FIG. 16 is a block diagram of a device according to an exemplary embodiment of the present invention.

DETAILED DESCRIPTION OF EXEMPLARY EMBODIMENTS OF THE INVENTION

Figure 1:
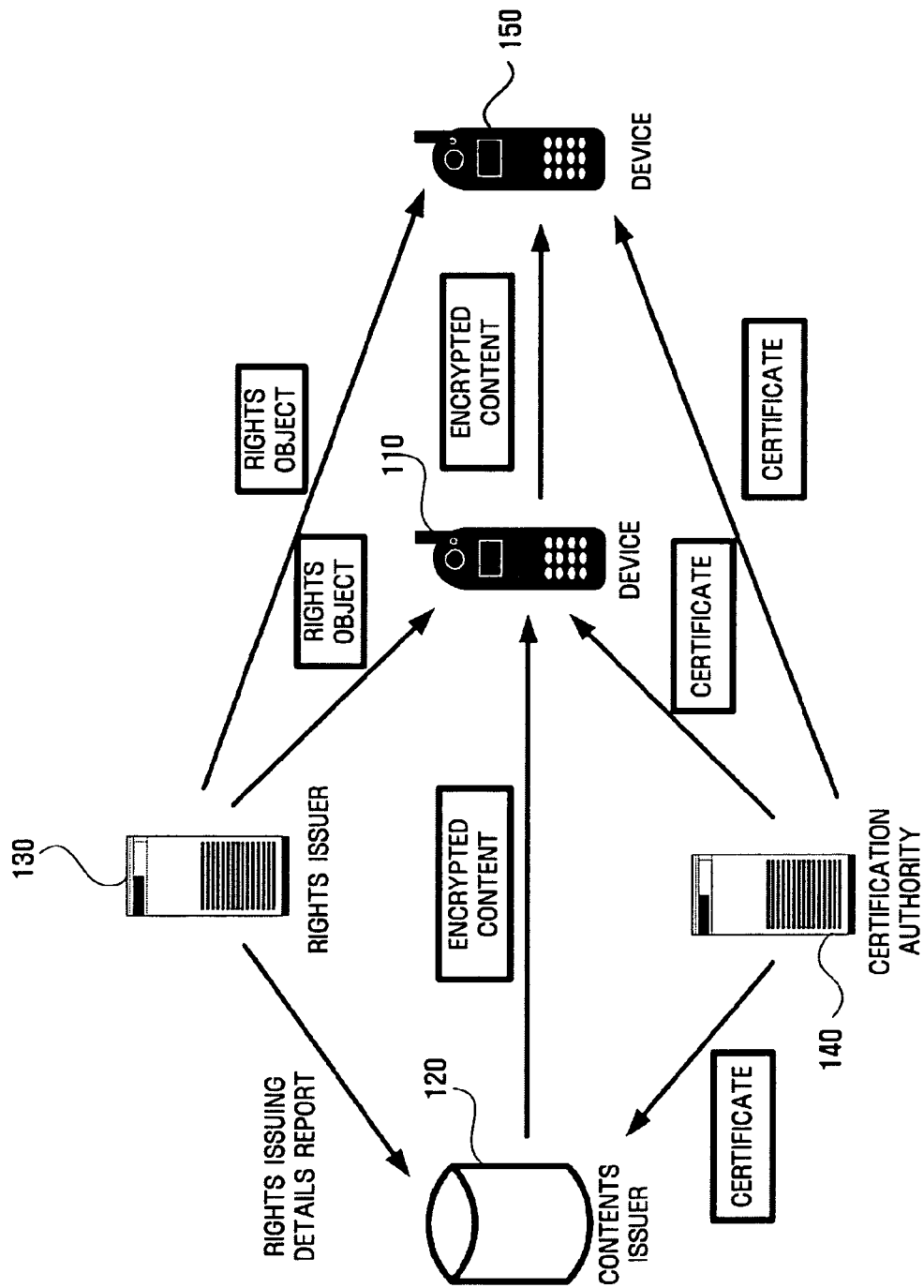
FIG. 1 is a diagram illustrating the concept of digital rights management (DRM)

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Before the detailed description is set forth, terms used in this specification will be described briefly. Description of terms is provided to facilitate a better understanding of the specification and terms that are not explicitly defined herein are not intended to limit the scope of the invention.

Public-Key Cryptography

Public-key cryptography is referred to as an asymmetric cipher in which a key used for encryption is different from a key used for decryption. In public-key cryptography, an encryption key consists of a pair of a public key and a private key. The public key is not necessary to be kept in secret, i.e., the public is easily accessible thereto while the private key must be known only to a specific device. A public-key cryptography algorithm is open to the public, but it is very difficult to decrypt original content even when knowing the cryptographic algorithm, the encryption key, and the ciphered text. Examples of a public-key cryptography system include Diffie-Hellman, RSA, ElGamal, and elliptic curve cryptography. The public-key cryptography is 100 to 1000 times slower than symmetric-key cryptography and thus is usually used for key exchange and digital signatures and not for encryption of content.

Symmetric-Key Cryptography

Symmetric-key cryptography is referred to as a secret-key cryptography that uses the same key for encryption and decryption. A data encryption standard (DES) is the most common symmetric cipher. Recently, applications using an advanced encryption standard (AES) has become popular.

Digital Signature

A digital signature is generated by a signer to indicate that a document has been written. Examples of a digital signature are an RSA, an ElGamal, a DSA, and a Schnorr digital signature. When the RSA digital signature is used, a sender encrypts a message with his/her private key and sends the encrypted message to a recipient. The recipient decrypts the encrypted message with the sender's public key. In this case, it is proved that the message was encrypted by the sender.

Random Number

A random number is a sequence of numbers or characters with random properties. Since it costs a lot to generate a complete random number, a pseudorandom number may be used.

Portable Storage

A portable storage used in the present invention includes a non-volatile memory such as a flash memory which data can be written to, read from, and deleted from and which can be connected to a device. Examples of such portable storage are smart media, memory sticks, compact flash (CF) cards, xD cards, and multimedia cards. Hereinafter, a multimedia card (MMC) will be explained as an exemplary embodiment of the portable storage.

Rights Object (RO)

This is a sort of license defining the rights to use encrypted content and constraints to rights, etc. The rights object used in the present invention will be described in detail with reference to FIGS. 3 and 4.

Playback

"Playback" is a representative concept of using an encrypted content. "Playback" may mean "Play", "Display", "Execute", and "Print" which are types of permission described with reference to FIG. 3

Figure 2:
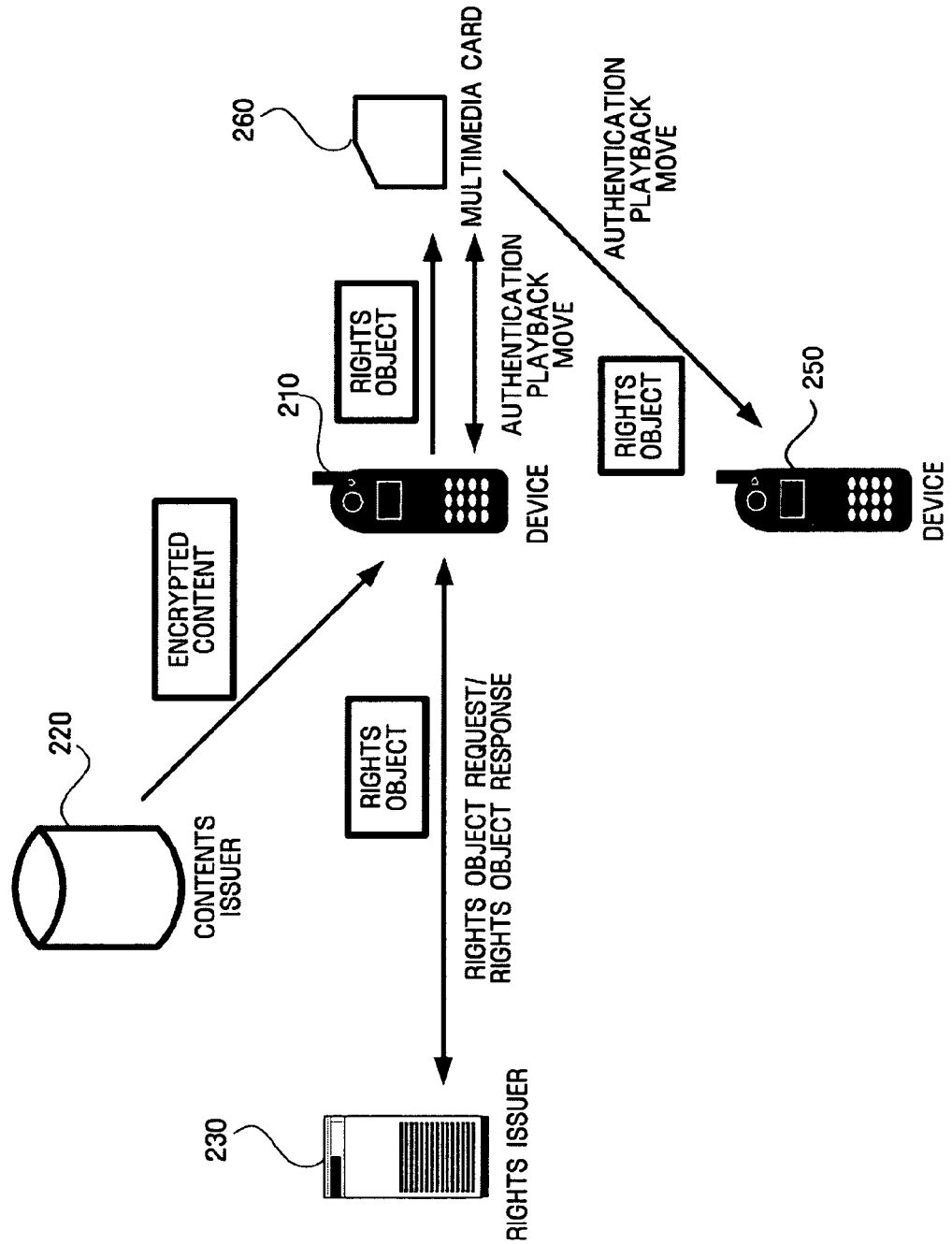
FIG. 2 is a schematic diagram illustrating the concept of DRM between a portable storage and a device.

FIG. 2 is a schematic diagram illustrating the concept of digital rights management (DRM) between a portable storage and a device.

A device 210 can obtain encrypted content from a contents issuer 220. The encrypted content is content protected through DRM. To use the encrypted content, a rights object for the encrypted content is needed.

After obtaining the encrypted content, the device 210 requests a rights object from a rights issuer 230 to obtain a right to playback the encrypted content. When the device 210 receives the rights object from the rights issuer 230, the device 210 can use the encrypted content using the rights object.

Meanwhile, the device 210 may transfer the rights object to a device 250 through a portable storage. In one exemplary embodiment, the portable storage may be a multimedia card 260 having a DRM function. Hereinafter, an MMC will be explained as a portable storage but the invention is not limited thereto.

The device 210 can move or copy the rights object to the multimedia card 260 after authenticating with the multimedia card 260. Thereafter, to playback the encrypted content, the device 210 requests a right to playback from the multimedia card 260 and receives the right to playback, e.g., a content encryption key (CEK), from the multimedia card 260.

Meanwhile, the device 250 can also request a right to playback particular content from the multimedia card 260 storing rights objects after authenticating with the multimedia card 260 and playback the encrypted particular content. In addition, the device 250 can acquire a rights object through a move or a copy from the multimedia card 260.

FIG. 3 illustrates the format of a rights object according to an exemplary embodiment of the present invention.

The rights object includes a version field 300, an asset field 320, and a permission field 330.

The version field 300 contains version information of a DRM system. The asset field 320 contains information regarding content data, the consumption of which is managed by the RO. The permission field 340 contains information regarding usage and action that are permitted by a rights issuer with respect to the content protected through DRM.

In the information stored in the asset field 320, "Id" information indicates an identifier used to identify the RO. "Uid" information is used to identify the content the usage of which is dominated by the RO and is a uniform resource identifier (URI) of content data of a DRM content format (DCF).

"Key Value" information contains a binary key value used to encrypt the content, which is referred to as a content encryption key (CEK). The CEK is a key value used to decrypt encrypted content to be used by a device. When the device receives the CEK from an MMC, it can use the content.

The permission field 340 is a right to use content permitted by the rights issuer. Types of permission include "Play", "Display", "Execute", "Print", and "Export".

The Play permission is a right to express DRM content in the form of audio/video. For example, if the DRM content is a movie or music, play is set as a permission element of a right to use the DRM content. If any constraint is specified, DRM agent grants play right according to the specified constraint. However, if no constraints are specified, the DRM agent grants unlimited Playback rights. The DRM agent's function can be implemented by control modules 620 and 720 shown in FIGS. 15 and 16, respectively.

The Display permission indicates a right to display DRM content through a visual device.

The Execute permission indicates a right to use DRM content such as JAVA games and other application programs.

The Print permission indicates a right to generate a hard copy of DRM content such as jpeg images.

The Play, Display, Execute, and Print are generally referred to as the term Playback.

Meanwhile, the Export permission indicates a right to send DRM contents and corresponding ROs to a DRM system other than an open mobile alliance (OMA) DRM system or a content protection architecture.

The Export permission necessarily has constraints that specify DRM systems or content protection structures to which the DRM content and rights objects can be sent. The Export permission has two modes: a move mode and a copy mode. In the move mode, a rights object is deactivated in a current DRM system when it is transmitted to another system. However, in the copy mode, the rights object is not deactivated in the current DRM system.

FIG. 4 is a table illustrating types of constraints specified on the permission shown in FIG. 3. Constraints on permission limit consumption of digital content.

A Count constraint 400 has a positive integer value and specifies the number of times of permission given to content.

A Datetime constraint 410 specifies a time limit of the permission and optionally includes a start item and an end item. When the start item is specified, access is not permitted before a particular time on a particular date. When the end item is specified, access is not permitted after a particular time on a particular date.

An Interval constraint 420 specifies a duration for which a right is effective on DRM content. When the start item is specified, consumption of DRM content is permitted during a period of time specified by the Interval constraint after a particular time on a particular date. When the end item is specified, consumption of DRM content is permitted during a period of time specified by the Interval constraint before a particular time on a particular date.

An Accumulated constraint 430 specifies a maximum measured time for which a right can be performed on DRM content. A DRM agent does not permit access to DRM content after an accumulated time specified by a value of the Accumulated constraint has lapsed.

An Individual constraint 440 specifies an individual who can use content.

A System constraint 450 specifies a DRM system or a content protection structure to which content and a rights object can be transmitted. In the System constraint 450, a Version item indicates version information of the DRM system or the content protection structure. A SID item indicates a name of the DRM system or the content protection structure.

Meanwhile, to enable communication, a multimedia card and a device mutually perform authentication.

FIG. 5 illustrates authentication between a device 510 and a multimedia card 520. Here, a subscript "D" of an object indicates that the object is possessed or generated by a device and a subscript "M" of an object indicates that the object is possessed or generated by a multimedia card.

Authentication is a procedure in which the device 510 and the MMC 520 authenticate each other's genuineness and exchange random numbers for generation of a session key. The device 510 and the MMC 520 can generate a session key using the random number obtained during authentication. In FIG. 5, descriptions above arrowed lines relate to a command requesting performance of a certain operation and descriptions below the arrow-headed lines relate to a parameter needed to execute the command or data transported, which is also applied to illustrations of FIGS. 6 and 14.

In an exemplary embodiment of the present invention, the device 510 issues all commands for the authentication and the MMC 520 performs operations needed to execute the command. For example, a command such as an authentication response may be sent from the device 510 to the MMC 520. Then, the MMC 520 sends an $ID_M$, a $certificate_M$ and an encrypted $random number_M$ to the device 510 in response to the authentication response S20. Thus, it is understood that directions of arrowed-lines represent directions of data transported.

In another exemplary embodiment of the present invention, both of the device 510 and the MMC 520 may issue commands. For example, the MMC 520 may send the authentication response together with the $ID_M$, the $certificate_M$ and the encrypted $random number_M$ to the device 510. Detailed descriptions of the authentication procedure will be set forth below.

The device 510 and the multimedia card 520 use a pair of related keys when exchanging significant information such as random number. In detail, each of the device 510 and the multimedia card 520 has a key pair comprised of two related keys. The device 510 has a first key and a second key. Data encrypted using the first key can be decrypted using the second key and data encrypted using the second key can be decrypted using the first key. One of the two keys may be made public to other devices and multimedia cards. For example, the first key may be used as a public key that other devices can read and the second key may be used as a private key that can be read by the device 510 but is kept secret not to be read by the other devices or multimedia cards. Similarly, the multimedia card 520 has a third key that is made public to be read by other devices and a fourth key that only the multimedia card 520 can read.

In operation S10, the device 510 sends an authentication request to the multimedia card 520. When requesting authentication, the device 510 sends a device $public key_D$ to the multimedia card 520. In operation S10, the device public $key_D$ may be sent through a device $certificate_D$ issued to the device 510 by a certification authority. The device $certificate_D$ contains the device public $key_D$ and is signed with a digital signature of the certification authority. Based on the device $certificate_D$, the multimedia card 520 can ascertain whether the device 510 is proper, and obtains the device public $key_D$. A device $ID_D$ may be sent together with the device $certificate_D$.

In operation S12, the multimedia card 520 determines whether the device certificates expires and verifies whether the device $certificate_D$ is valid using a certificate revocation list (CRL). If the device $certificate_D$ expires or is registered in the CRL, the multimedia card 520 may reject authentication with the device 510. In this case, the multimedia card 520 reports the rejection to the device 510. Then, the device 510 stops a DRM procedure.

When the DRM procedure is stopped due to the above-described reason, the device 510 may perform a procedure for obtaining a new certificate.

If it is determined that the device $certificate_D$ is not registered in the CRL, the multimedia card 520 obtains the device public $key_D$ using the device $certificate_D$.

In operation S14, the multimedia card 520 generates a random $number_M$. In operation S16, the random $number_M$ is encrypted using the device public $key_D$.

In operation S20, an authentication response procedure is performed by sending an authentication response command from the device 510 to the multimedia card 520 or from the multimedia card 520 to the device 510. During the authentication response procedure, the multimedia card 520 sends the multimedia card public $key_M$ and an encrypted random $number_M$ to the device 510. In an exemplary embodiment of the present invention, instead of the multimedia card public $key_M$, a multimedia card $certificate_M$ may be sent. In another exemplary embodiment of the present invention, the multimedia card 520 may send the multimedia card certificates, the encrypted random $number_M$, and information regarding a date at which the CRL of the multimedia card 520 (referred to as "multimedia card CRL issue date information") has been issued to the device 510. In this case, the device 510 and the multimedia card 520 can share a most update CRL. Meanwhile, since the CRL is not frequently updated generally, the multimedia card CRL issue date information is sent before the CRL is sent to reduce overhead occurring during the authentication procedure. When the multimedia card CRL issue date information is sent, it may be encrypted and transmitted together with or separately from the random $number_M$. Besides, a multimedia card $ID_M$ may also be transmitted together.

In operation S22, the device 510 receives the multimedia card $certificate_M$ and the encrypted random $number_M$, verifies the multimedia card certificates, and decrypts the encrypted random $number_M$. The device 510 can confirm that the multimedia card 520 is proper by verifying the multimedia card $certificate_M$ and can obtain the multimedia card public $key_M$. Through the verification of the multimedia card $certificate_M$, the device 510 can determine whether the multimedia card $certificate_M$ expires and is registered in the CRL. The device 510 can also obtain the random $number_M$ by decrypting the encrypted random $number_M$ using a device private $key_D$.

Next, in operation S24, the device 510 generates a random $number_D$. In operations S26, the device 510 encrypts the random $number_D$ using the multimedia card public $key_M$. Thereafter, an authentication end request is transmitted from the device 510 to the multimedia card 520 in operation S30 where the device 510 sends the encrypted random $number_D$ to the multimedia card 520. In an exemplary embodiment of the present invention, the device 510 may send information regarding a date at which the CRL of the device 510 (referred to as "device CRL issue date information") has been issued to the multimedia card 520 together with the encrypted random $number_D$. Here, the device CRL issue date information may be encrypted and transmitted together with or separately from the random $number_D$.

In operation S32, the multimedia card 520 receives and decrypts the encrypted random $number_D$. As a result, the device 510 and the multimedia card 520 shares their own random number and each other's random number. In operations S40 and S42, the device 510 and the multimedia card 520 generates a session key using the shared random numbers. Here, since both the device 510 and the multimedia card 520 generate their own random numbers and use their own and each other's random numbers, randomness can greatly increase and secure authentication is possible. In other words, even if one of random number$_D$ and random number$_M$ has weak randomness, the other of them can supplement randomness.

Through the above-described operations, the device 510 and the multimedia card 520 can mutually authenticate each other and share the session key. In operation S50, an authentication end response is transmitted from the multimedia card 520 to the device 510 to verify whether the session keys respectively generated by the device 510 and the multimedia card 520 are identical with each other.

In other words, if one of the device 510 and the multimedia card 520 encrypts information known to the other one using its session key and transmits the encrypted information to the other one, which decrypts the encrypted information using its session key, thereby verifying whether each other's session keys are identical. In an exemplary embodiment of the present invention, the multimedia card 520 encrypts the random number$_D$ generated by the device 510 using its session key and transmits the encrypted random number$_D$ to the device 510. Then, in operation S52, the device 510 receives and decrypts the encrypted random number$_D$ using its session key and determines whether the random number$_D$ is restored to verify whether the session key is generated properly.

In another exemplary embodiment of the present invention, a predetermined period of time after transmitting the authentication end request in operation S30, the device 510 encrypts the random number$_M$ generated by the multimedia card 520 using the session key generated by the device 510 and transmits the encrypted random number$_M$ to the multimedia card 520. Then, the multimedia card 520 decrypts the encrypted random number$_M$ using its session key, and therefore, whether the session key is generated properly can be verified.

In an exemplary embodiment of the present invention, if the session key is not properly generated, the authentication is performed all over again. In another exemplary embodiment of the present invention, if the session key is not properly generated, the DRM procedure between the device 510 and the multimedia card 520 is terminated.

In this exemplary embodiment, a random number may be generated using a random number generation module (not shown). Alternatively, a random number may be one number selected from a plurality of numbers stored in a device or an MMC or a combination of multiple numbers selected therefrom. In addition, a random number may not only be a numeral but a character string. Accordingly, a random number may indicate a number, a combination of numbers, or a character string that is generated using a random number generation module, or may indicate one number, a combination of multiple numbers, one character string, or a combination of multiple character strings selected from a plurality of numbers or character strings stored previously.

In an exemplary embodiment of the present invention, two random numbers are used during authentication between the device 510 and the multimedia card 520, thereby enabling safer DRM to be accomplished. In addition, due to the verification of a session key, it can be determined whether the authentication has been performed properly. In the exemplary embodiment of the present invention, the safe DRM operation between the device 510 and the multimedia card 520 can be guaranteed by using a session key generated during the authentication. Alternatively, for much safer DRM operation, a verification procedure may be further provided after the authentication, which will be described with reference to FIG. 6.

Figure 6:
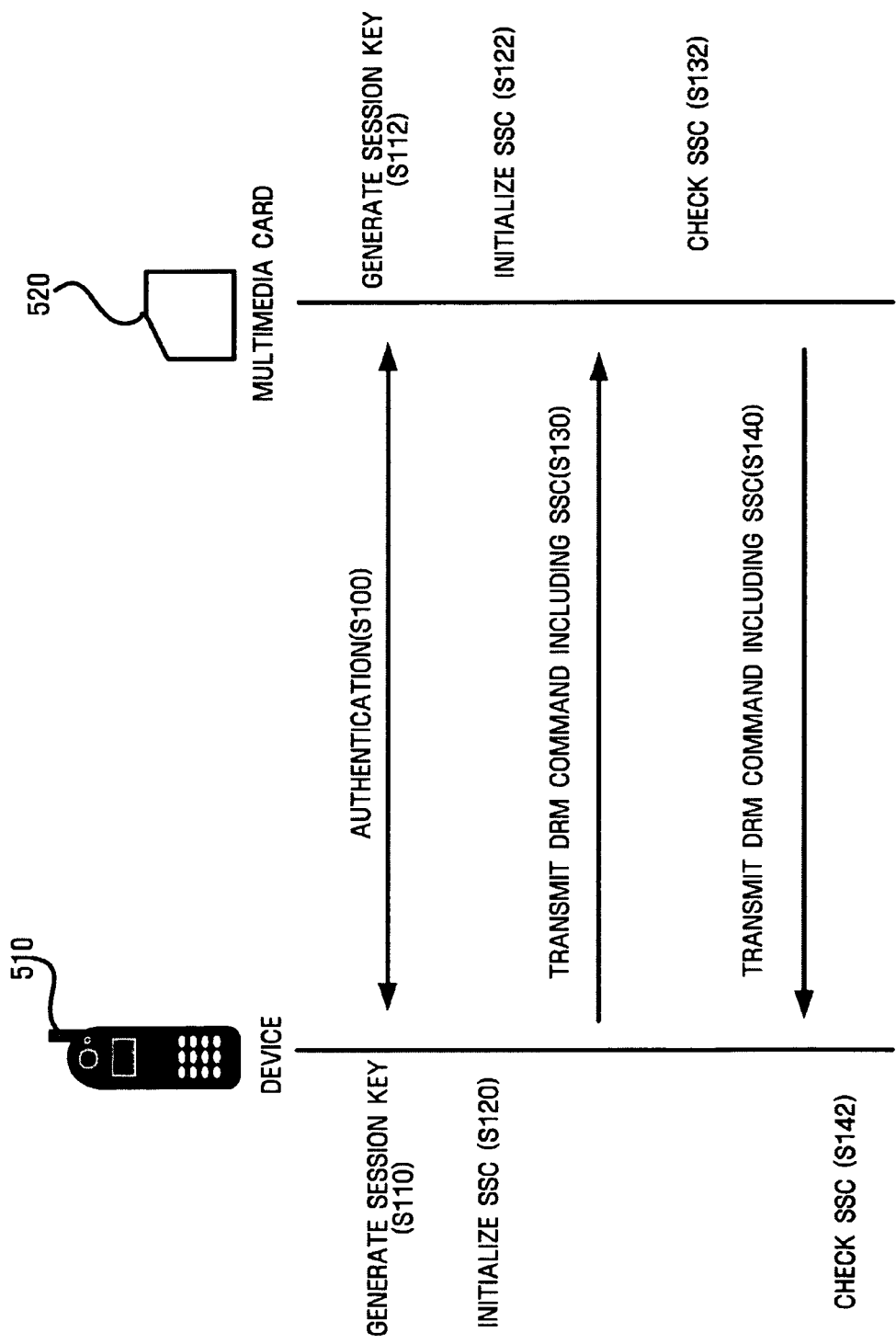
FIG. 6 illustrates a DRM procedure using a send sequence counter (SSC) according to an exemplary embodiment of the present invention.

FIG. 6 is a diagram illustrating a DRM procedure in which a send sequence counter (SSC) is used in an exemplary embodiment of the present invention.

Diverse operations may be performed between a device 510 and a multimedia card 520. Operations such as a move, copy, and deletion of a rights object are involved with a DRM procedure for the rights object and a playback is involved with a DRM procedure for content. Authentication between the device 510 and the multimedia card 520 is the premise of these DRM procedures. In other words, to perform a DRM procedure, authentication must be performed between the device 510 and the multimedia card 520 in operation S100. As a result of the authentication, the device 510 and the multimedia card 520 generate identical session keys, respectively, in operations S110 and S112. After the device 510 and the multimedia card 520 share the session key, DRM procedures can be performed. To accomplish DRM with excellent security, an SSC may be used. The SSC is included in an application protocol data unit (APDU) and increases whenever the APDU is transmitted. For example, if one or more APDUs are intercepted by an unauthorized user, the SSC included in the APDU has discontinuity. In addition, if an unauthorized user inserts an APDU, the SSC also has discontinuity.

After the authentication, the device 510 and the multimedia card 520 initialize their SSCs for the DRM procedure in operations S120 and S122, respectively. In an exemplary embodiment of the present invention, the SSC is initially set to a number, that is, a combination of a random number$_D$ and a random number$_M$. For example, when the SSC is two bytes in size, it may be initially set to a combination of the last one byte of the random number$_D$ and the last one byte of the random number$_M$. For example, if the last one byte of the random number$_D$ is "01010101" and the last one byte of the random number$_M$ is "11111110", the SSC is initially set to "0101010111111110". When an initial value of the SSC is obtained using the random number$_D$ and the random number$_M$, randomness can be increased compared to when the SSC is initially set to "0000000000000000", and therefore, the DRM procedure can be performed more securely.

When the device 510 issues a DRM command to the multimedia card 520, the SSC is included in an APDU in operation S130. If 10 APDUs are transmitted for the DRM command, the SSC increases by 1 from the initial value "0101010111111110" whenever each APDU is transmitted. Then, the multimedia card 520 checks the SSC and determines whether an inauthentic APDU is inserted during transmission or an authentic APDU is intercepted in operation S132.

When the multimedia card 520 issues a DRM command to the device 510, the SSC is included in an APDU in operation S140. In an exemplary embodiment of the present invention, a value of the SSC included in a first APDU for the DRM command may be the initial value to which the SSC is initially set to. For example, when 10 APDUs are transmitted for the DRM command, the SSC may be increased by 1 from the initial value "0101010111111110" whenever each APDU is transmitted. In another exemplary embodiment of the present invention, the value of the SSC included in the first APDU for the DRM command may be set based on a latest value of the SSC. For example, when the latest value of the SSC is "1000000000000000", a value of the SSC included in the first APDU for the DRM command becomes "1000000000000001". Then, in operation S142, the device 510 checks the SSC and determines whether an inauthentic APDU is inserted during transmission or an authentic APDU is intercepted.

Sequentially increasing the SSC is just an example. The SSC may be decreased sequentially or increased or decreased by a value other than one, without departing from the spirit and scope of the present invention.

Hereinafter, in exemplary embodiments of the present invention, it may be assumed that data to be transmitted and an SSC value are encrypted and included in an APDU transmitted between a device and a multimedia card even if it is not specially mentioned.

Between a device and a multimedia card which have authenticated each other, a move or copy of a rights object can be performed. Through the move or copy of the rights object, the multimedia card can store the rights object. When the rights object is stored in the multimedia card, the device may send a playback request to the multimedia card to playback encrypted content. When the device playbacks the content using the rights object stored in the multimedia card, for example, constraint information set for the rights object must be updated.

The update of a rights object stored in a portable storage may be performed by a device. In a conventional technique (e.g., when a portable storage is a secure digital (SD) card), to update the rights object, the whole rights object may be moved from the portable storage to the device. However, when the whole rights object is moved whenever the rights object is updated, communication overhead occurs between the device and the portable storage. Accordingly, in exemplary embodiments of the present invention, to update a rights object, a data format including basic information for identifying the rights object and permission information of the rights object may be moved.

In addition, according to the present invention, when the device requests to check the permission information of a rights object stored in the portable storage, the data format may also be moved, thereby reducing communication overhead between the device and the portable storage and rapidly transmitting necessary information.

Such data format including basic information for identifying a rights object and permission information of the rights object is referred to as a CPSF.

Figure 7:
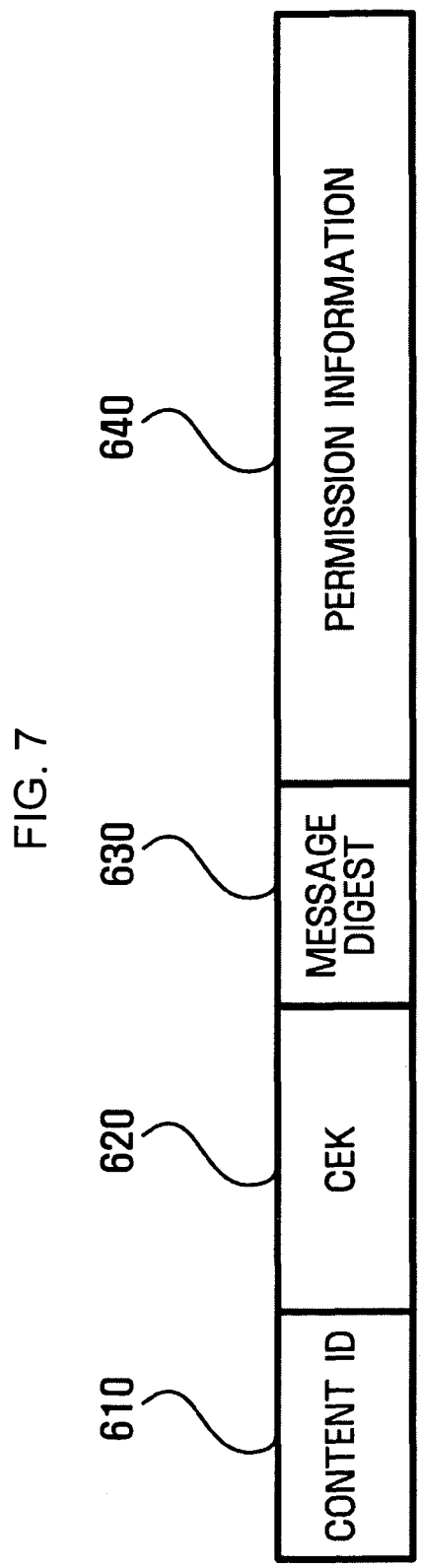
FIG. 7 illustrates the fundamental structure of a current permission status format (CPSF) according to an exemplary embodiment of the present invention.

FIG. 7 illustrates the fundamental structure of the CPSF according to an exemplary embodiment of the present invention.

In a content ID field 610 included in the CPSF, a content ID for identifying particular content that can be used via the rights object is set. In a CEK field 620, a CEK value for decrypting encrypted content is set. A device can use the content by receiving the CEK value.

In a message digest field 630, a message digest value is set for integrity protection of transmission data. The message digest value may be generated using a published hash algorithm (e.g., SHA1).

In a permission information field 640, permission information possessed by the RO is set.

The content of a CPSF may vary with a type of RO. In exemplary embodiments of the present invention, type of RO is divided into general RO type, child RO type, and parent RO type.

General RO is rights object that have no relations with a subscription model (or a subscription business model) described in open mobile alliance digital rights management (OMA DRM) v2.0 rights expression language (REL).

Rights object corresponding to the subscription model described in the OMA DRM v2.0 REL may be divided into child RO and parent RO. The child RO includes a CEK that is a right to use encrypted content. The parent RO includes a permission item and a constraint for the permission item. Other details of the child RO and the parent RO are described in the OMA DRM v2.0 REL. The details of the OMA DRM can be obtained at http://www.openmobilealliance.org/.

The CPSF varying with a type of RO will now be described.

Figure 8:
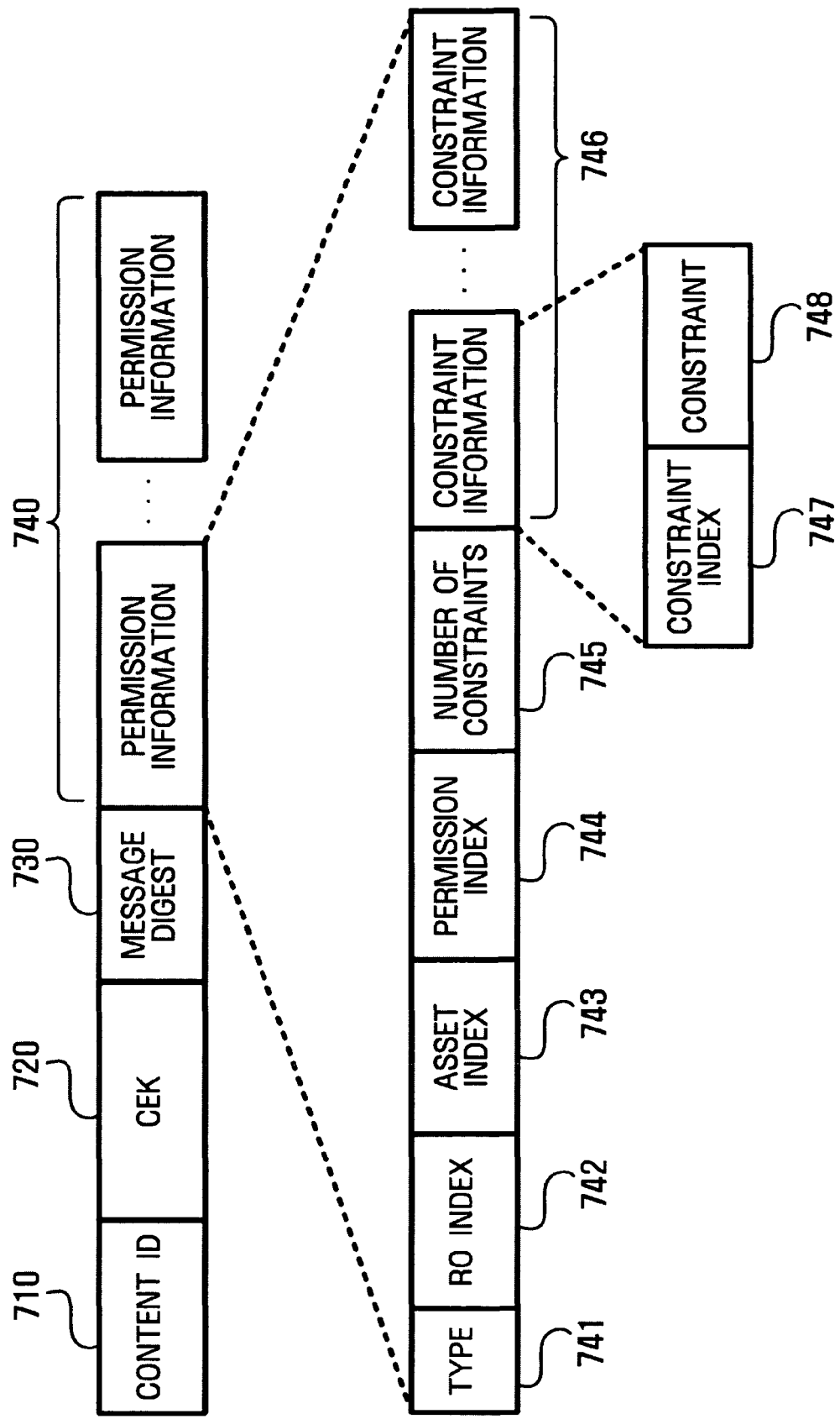
FIG. 8 illustrates the CPSF structure for a general rights object according to an exemplary embodiment of the present invention.

FIG. 8 illustrates the structure of a CPSF for a general rights object according to an exemplary embodiment of the present invention.

Descriptions of a content ID field 710 for identifying particular content, a CEK field 720, and a message digest field 730 are respectively identical with those of the content ID field 610, the CEK field 620, and the message digest field 630 which are described with reference to FIG. 7. The CPSF of a general RO may include at least one permission information field 740, which includes subfields that follow.

A type field 741 includes information for identifying a type of the RO. Table 1 shows types of ROs.

TABLE 1

| Type of RO | Identification information (1 byte) |
| --- | --- |
| General RO | 0x01 |
| Child RO | 0x02 |
| Parent RO | 0x03 |

Referring to Table 1, the type field 741 shown in FIG. 8 includes identification information of 0x01.

An RO index field 742 and an asset index field 743 include an internal RO ID and an internal asset ID, respectively, in an MMC. The internal RO ID and the internal asset ID may be respectively used to identifying an RO and an asset stored in the MMC.

A permission index field 744 includes identification information for identifying a type of permission. Examples of the permission index are shown in Table 2.

TABLE 2

| Permission name | Permission index (1 byte) |
| --- | --- |
| All | 0x00 |
| Play | 0x01 |
| Display | 0x02 |
| Execute | 0x03 |
| Print | 0x04 |
| Export | 0x05 |
| Move | 0x06 |
| Copy | 0x07 |

The types of permissions have been described with reference to FIG. 3.

A number-of-constraints field 745 includes a number of constraint information field 746, which will later be described. Each constraint information field 746 includes a constraint index field 747 and a constraint field 748. The constraint index has information for identifying a type of constraint, and examples thereof are shown in Table 3.

TABLE 3

| Constraint name | Constraint index (1 byte) |
| --- | --- |
| None | 0x00 |
| Count | 0x01 |
| Time Count | 0x02 |
| Interval | 0x03 |
| Accumulated | 0x04 |
| Datetime | 0x05 |
| Individual | 0x06 |
| System | 0x07 |

The Constraint field 748 includes detailed descriptions of the Constraint.

Figure 9:
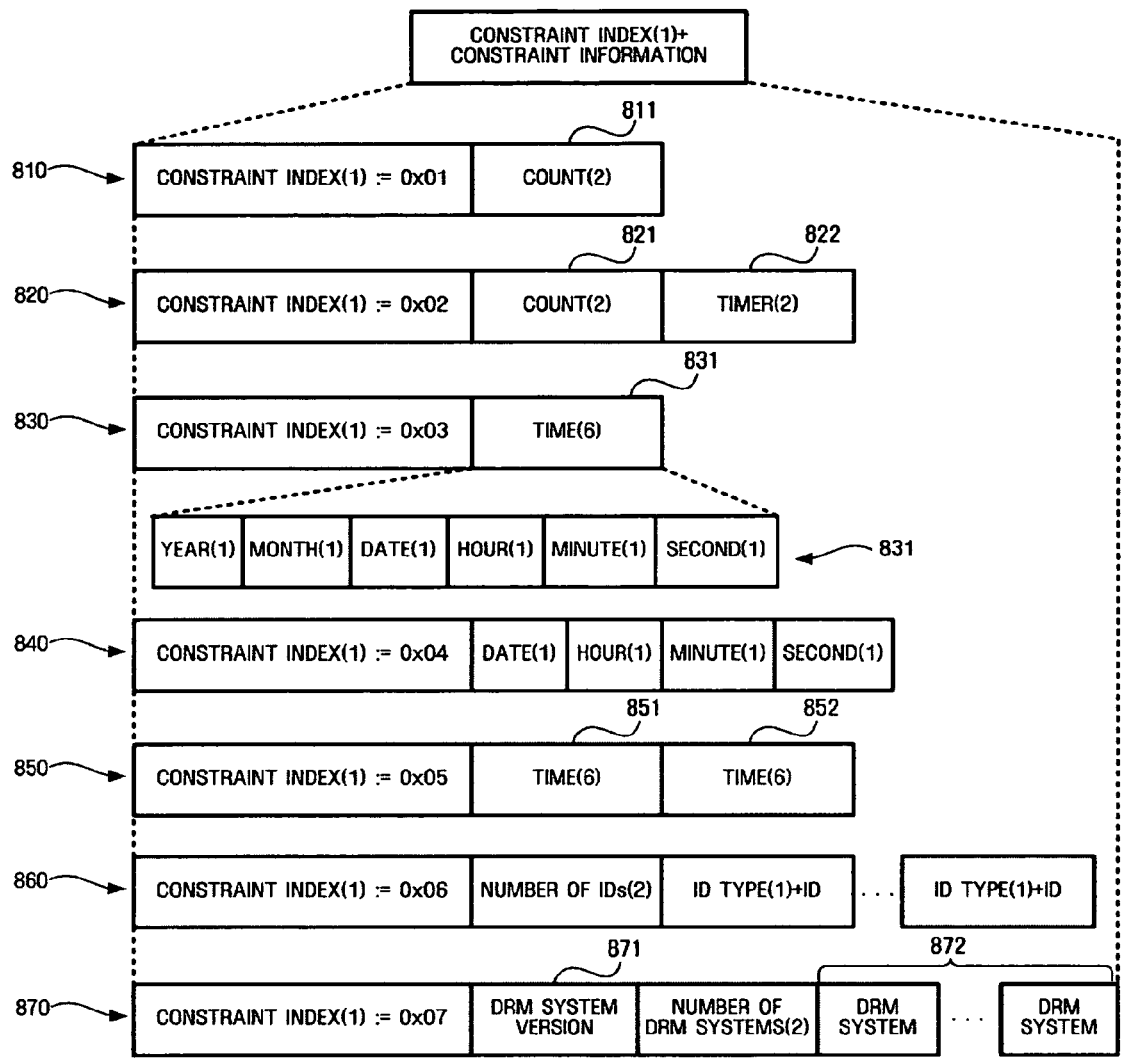
FIG. 9 illustrates a detailed constraint information field according to an exemplary embodiment of the present invention.

FIG. 9 illustrates a detailed constraint information field according to an exemplary embodiment of the present invention.

Numeral in parentheses in each field denotes the number of bytes available for the field.

A Count constraint 810 includes a two-byte count subfield 811 to specify the available count to playback content through the rights object.

A Time Count constraint 820 includes a count subfield 821 and a timer subfield 822 to specify the available count to playback content through the rights object during a period of time defined by the timer subfield 822.

An Interval constraint 830 includes a time subfield 831 to specify a duration for which the rights object is effective on DRM content.

An Accumulated constraint 840 specifies a maximum measured time for which the rights object can be performed on DRM content. A DRM agent does not permit access to DRM content after an accumulated time specified by a value of the Accumulated constraint has lapsed.

A Datetime constraint 850 includes two time subfields 851 and 852 to specify duration for a permission and optionally includes a start item and an end item. When the start item (first time subfield 851) is specified, access is not permitted before a particular time on a particular date. When the end item (second time subfield 852) is specified, access is not permitted after a particular time on a particular date.

An Individual constraint 860 specifies an individual who can use content, for example, using a uniform resource identifier (URL) of the individual. Accordingly, when a device user's identity is not identical with the identity of the individual permitted to use the DRM content, access to the DRM content is not permitted.

A System constraint 870 specifies a DRM system or a content protection structure to which content and a rights object can be transmitted. A DRM system version subfield 871 indicates version information of the DRM system or the content protection structure. A DRM system subfield 872 indicates a name of the DRM system or the content protection architecture.

Figure 10:
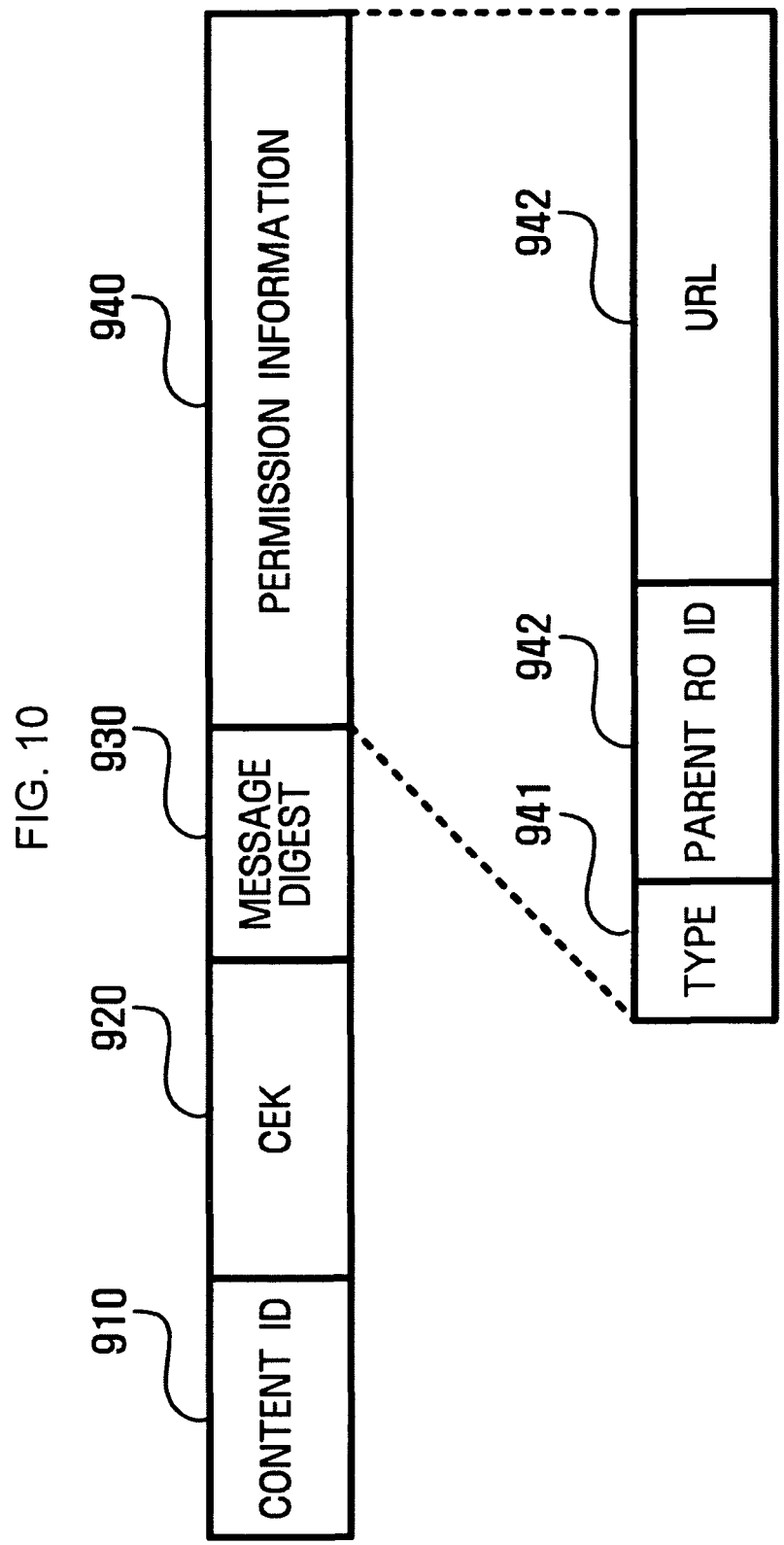
FIG. 10 illustrates the CPSF structure for a child rights object according to an exemplary embodiment of the present invention.

FIG. 10 illustrates the structure of a CPSF for a child rights object according to an exemplary embodiment of the present invention.

Since there is only one child rights object that can be used for a particular content, the CPSF shown in FIG. 10 may include a single permission information field 940.

Descriptions of a content ID field 910, a CEK field 920, and a message digest field 930 in the CPSF shown in FIG. 10 are respectively identical with those about the content ID field 610, the CEK field 620, and the message digest field 630 which are described with reference to FIG. 7.

A Type field 941 included in the permission information field 940 includes ID information for identifying a type of an RO, as shown in Table 1. In this case, 0x02 is set in the Type field 941.

A parent RO ID field 942 includes identification information for identifying a parent rights object of the child rights object. A URL field 943 includes a URL of a child RO issuer.

Figure 11:
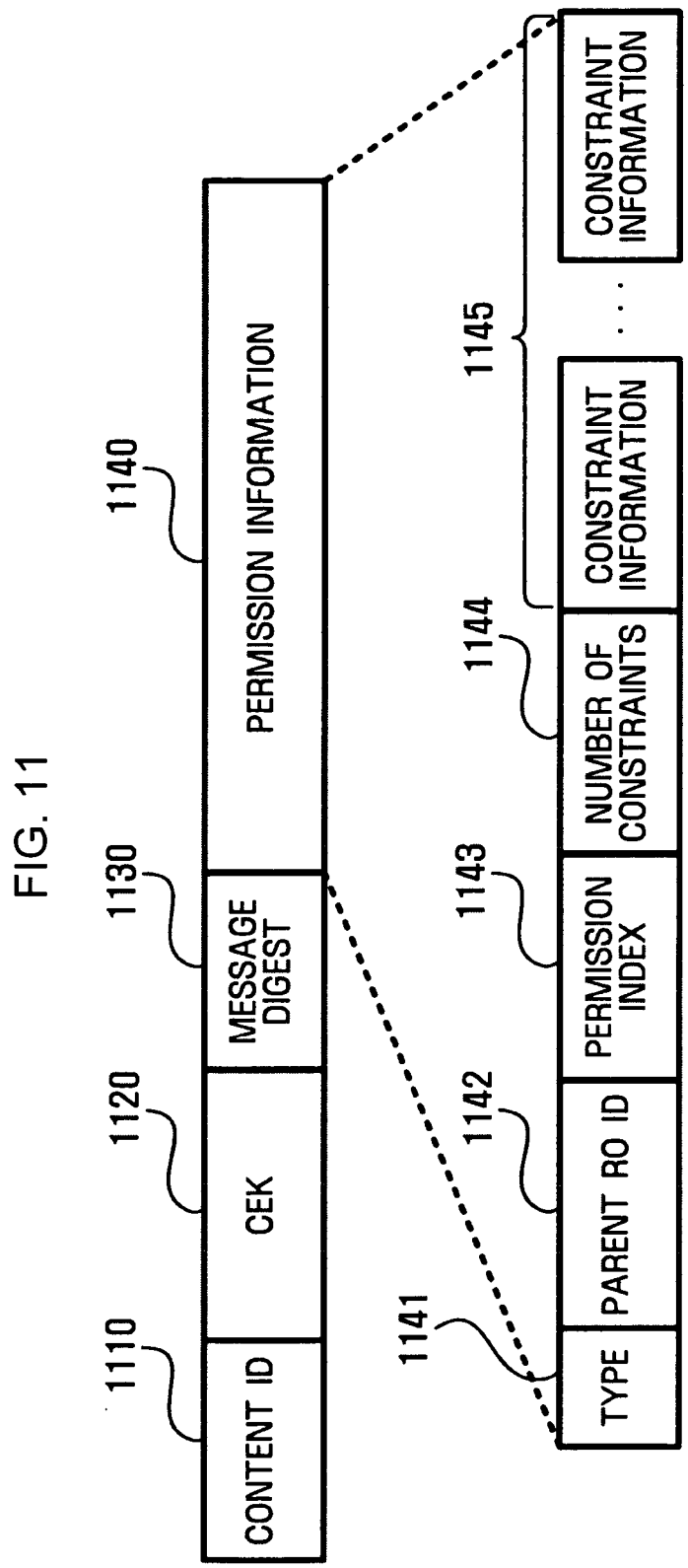
FIG. 11 illustrates the CPSF structure for a parent rights object according to an exemplary embodiment of the present invention.

FIG. 11 illustrates the structure of a CPSF for a parent rights object according to an exemplary embodiment of the present invention.

A content ID field 1110 is identical the content ID field 610 described above with reference to FIG. 7. However, the parent RO complying with the subscription model described in the OMA DRM v2.0 REL does not have a CEK and a message digest value, and therefore, a CEK field 1120 and a message digest field 1130 may be set to null.

Since there is only one parent RO allowing particular DRM content to be used, the CPSF includes a single permission information field 1140.

A Type field 1141 included in the permission information field 1140 includes ID information for identifying a type of an RO, as shown in Table 1. In this case, 0x03 is set in the Type field 1141.

A parent RO ID field 1142 includes identification information for identifying the parent rights object.

Descriptions of a permission index field 1143, a number-of-constrains field 1144, and a constraint information field 1145 are respectively identical with those of the permission index field 744, the number-of-constrains field 745, and the constraint information field 746 which are described with reference to FIG. 8.

Figure 12:
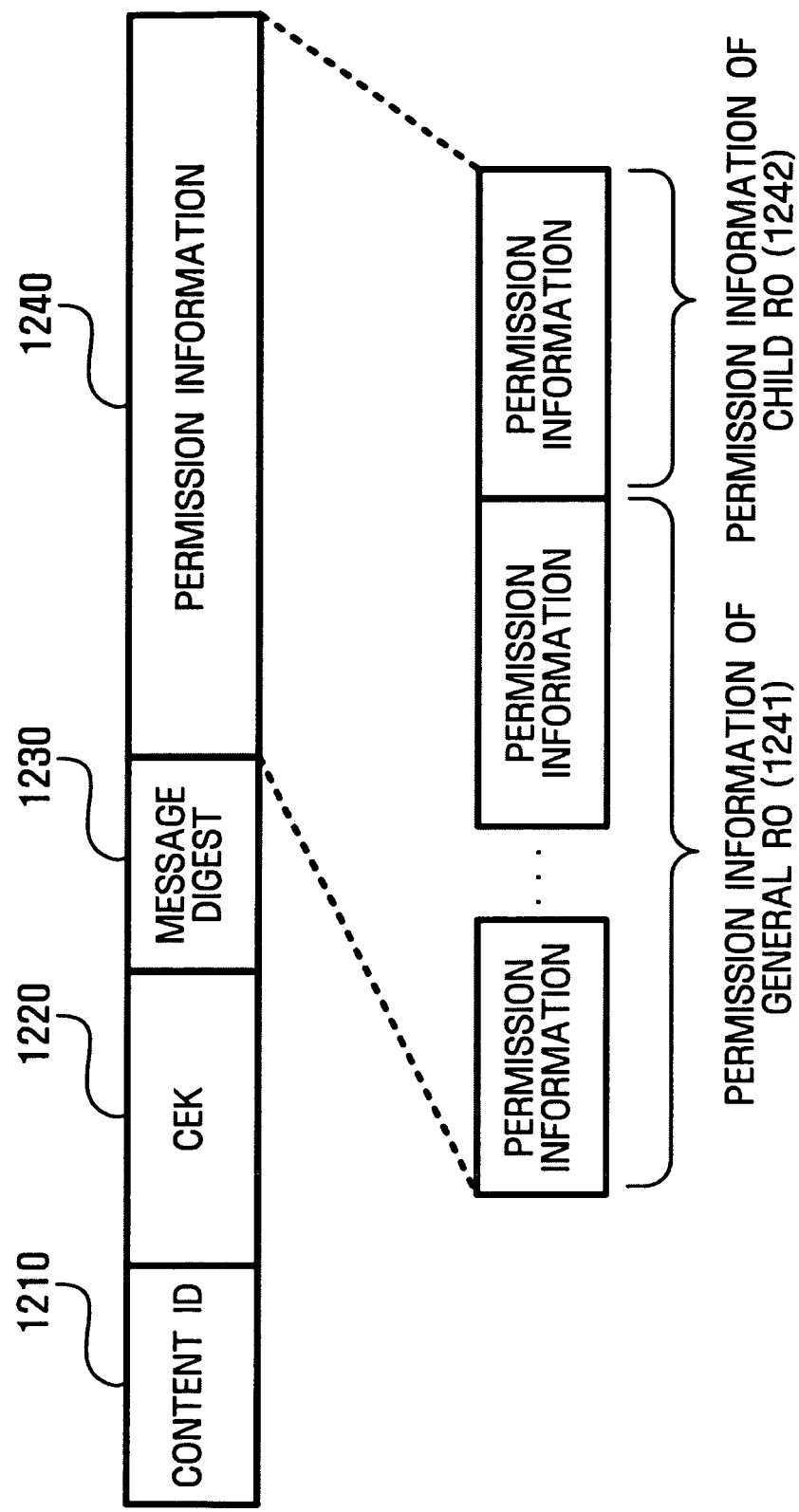
FIG. 12 illustrates the structure of a combination of the CPSF for the general rights object and the CPSF for the child rights object, according to an exemplary embodiment of the present invention.
Figure 13:
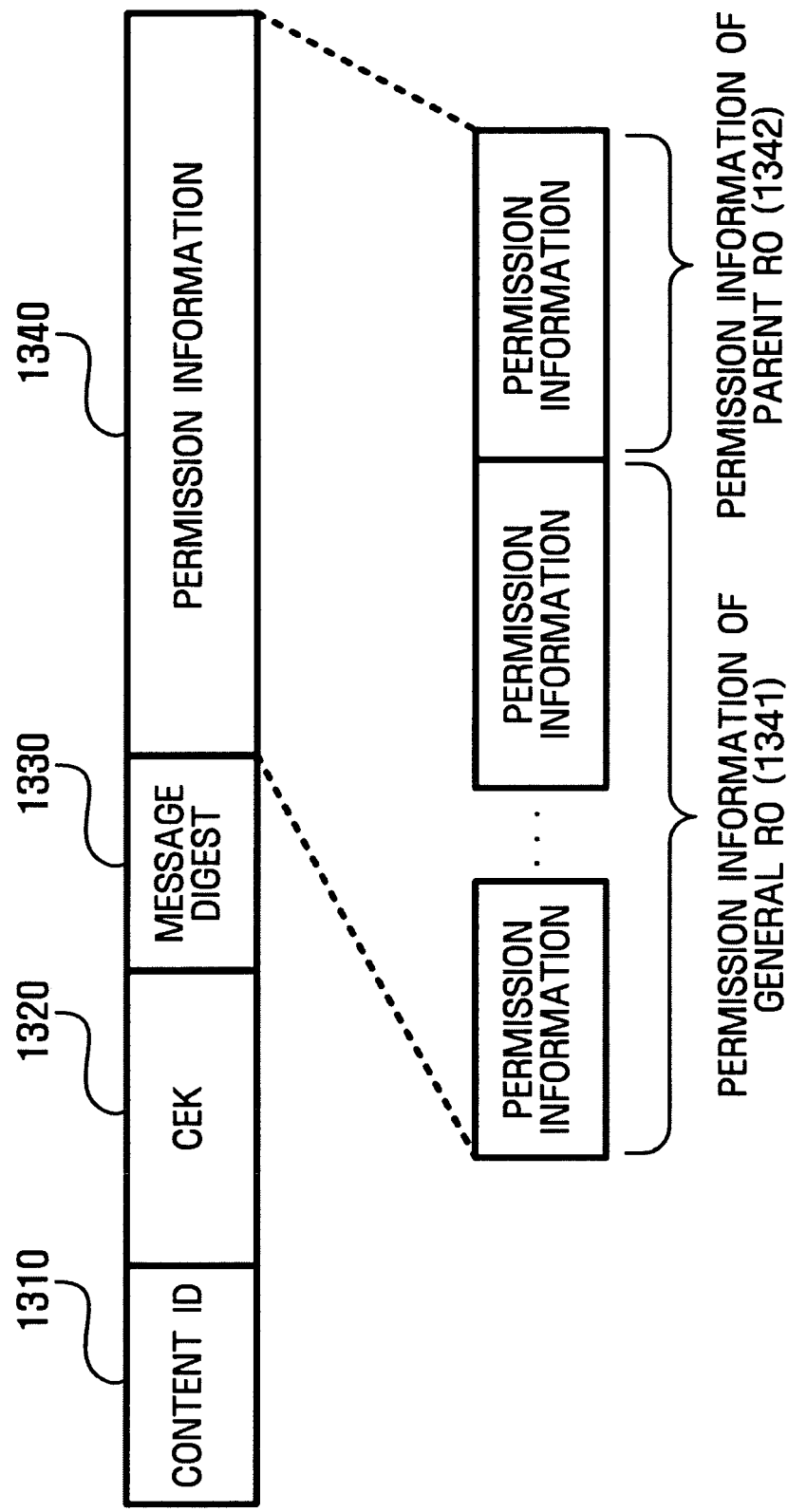
FIG. 13 illustrates the structure of a combination of the CPSF for the general rights object and the CPSF for the parent rights object, according to an exemplary embodiment of the present invention.

Meanwhile, a multimedia card can store both of a general rights object and a child rights object that allow playback of a content or both of the general rights object and a parent rights object that allow playback of the content. FIGS. 12 and 13 illustrate CPSFs transmitted from the multimedia card to a device in the respective cases.

FIG. 12 illustrates the structure of a combination of the CPSF for the general rights object and the CPSF for the child rights object, according to an exemplary embodiment of the present invention.

Descriptions of a content ID field 1210, a CEK field 1220, and a message digest field 1230 in the CPSF shown in FIG. 12 are respectively identical those of the content ID field 610, the CEK field 620, and the message digest field 630 described with reference to FIG. 7. In addition, a permission information field 1240 includes a permission information subfield 1241 for a general RO and a permission information subfield 1242 for a parent RO. Details of the respective permission information subfields have been described with reference to FIGS. 8 and 11.

FIG. 13 illustrates the structure of a combination of the CPSF for the general rights object and the CPSF for the parent rights object, according to an exemplary embodiment of the present invention.

Description of a content ID field 1310, a CEK field 1320, and a message digest field 1330 in the CPSF shown in FIG. 13 are respectively identical with those of the content ID field 610, the CEK field 620, and the message digest field 630 which are described with reference to FIG. 7. In addition, a permission information field 1340 includes a permission information subfield 1341 for a general RO and a permission information subfield 1342 for a parent RO. Details of the respective permission information subfields have been described with reference to FIGS. 8 and 11.

Figure 14:
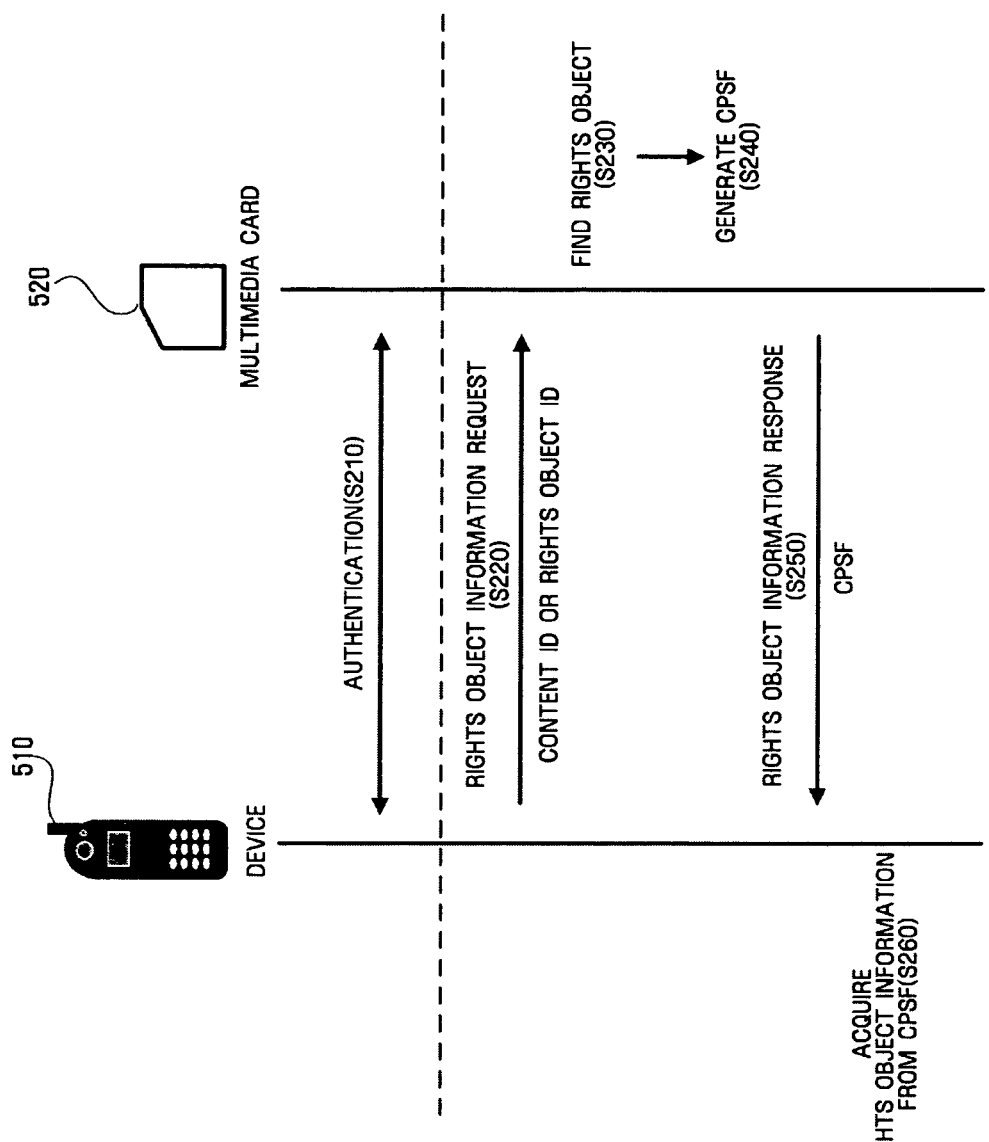
FIG. 14 is a flowchart of a procedure for transmitting rights object information between a device and a multimedia card according to an exemplary embodiment of the present invention.

FIG. 14 is a flowchart of a procedure for transmitting permission information possessed by a multimedia card according to an exemplary embodiment of the present invention.

After authentication between a device 510 and a multimedia card 520 is completed in operation S210, each of the device 510 and the multimedia card 520 can encrypt data using a session key generated as the result of the authentication, transmit the encrypted data, and decrypt the encrypted data received from each other.

The device 510 requests information of a particular rights object from the multimedia card 520 in operation S220. Then, the multimedia card 520 searches rights objects stored therein to find the rights object requested by the device 510 in operation S230. When requesting the rights object information in operation S220, the device 510 may send a rights object ID for identifying the rights object to the multimedia card 520 to designate the desired rights object. Alternatively, the device 510 may send a content ID for identifying a particular content. In this case, the multimedia card 520 searches for a rights object that can playback the content identified by the content ID.

After finding the rights object requested by the device 510, the multimedia card 520 determines a type of the rights object and generates a CPSF according to the type of the rights object in operation S240. The CPSF may have one of the structures shown in FIGS. 7 through 13 according to the type of the rights object. For example, when the rights object is a general rights object, the multimedia card 520 generates the CPSF having the structure shown in FIG. 8. When the rights object is a child rights object, the multimedia card 520 generates the CPSF having the structure shown in FIG. 10. When the rights object is a parent rights object, the multimedia card 520 generates the CPSF having the structure shown in FIG. 11. When a general rights object and a child rights object are simultaneously found, the multimedia card 520 generates the CPSF having the structure shown in FIG. 12. When a general rights object and a parent rights object are simultaneously found, the multimedia card 520 generates the CPSF having the structure shown in FIG. 13.

When the device 510 requests the rights object information to check the permission information of the rights object, the multimedia card 520 may set a CEK field to a null value when generating the CPSF. After generating the CPSF, the multimedia card 520 sends the CPSF as the rights object information to the device 510 in operation S250. Alternatively, the multimedia card 520 may store the CPSF and allow the device 510 to access the CPSF. The device 510 receives the CPSF and acquires the permission information of the rights object from the CPSF in operation S260.

When the device 510 sends a playback request to the multimedia card 520 to playback a particular content that can be played back using a rights object stored in the multimedia card 520, the multimedia card 520 may also generate a CPSF. For example, when the device 510 sends the playback request to the multimedia card 520 to playback the particular content, the multimedia card 520 may search for a rights object that can playback the particular content, generate a CPSF corresponding to a type of the rights object, and transmit the CPSF to the device 510. Then, the device 510 can acquire a CEK needed to playback the particular content from the CPSF and can also check constraint information regarding a playback right, such as information on how many times the particular content can be played back afterwards using the rights object.

When the device 510 updates a rights object stored in the multimedia card 520, the device 510 can update necessary permission information just by receiving a CPSF from the multimedia card 520 without receiving the whole rights object.

Accordingly, in an exemplary embodiment of the present invention, when receiving a request from the device 510, the multimedia card 520 performs operations S230 through S250. As described above, a request of the device 510 that make the multimedia card 520 generate a CPSF for a particular rights object may be a request for permission information of the particular rights object, a request for playback of a particular content, or a request for update of the particular rights object stored in the multimedia card 520. The CPSF generated by the multimedia card 520 may be transmitted to the device 510 as information of the rights object designated by the device 510, i.e., as rights object information.

Figure 15:
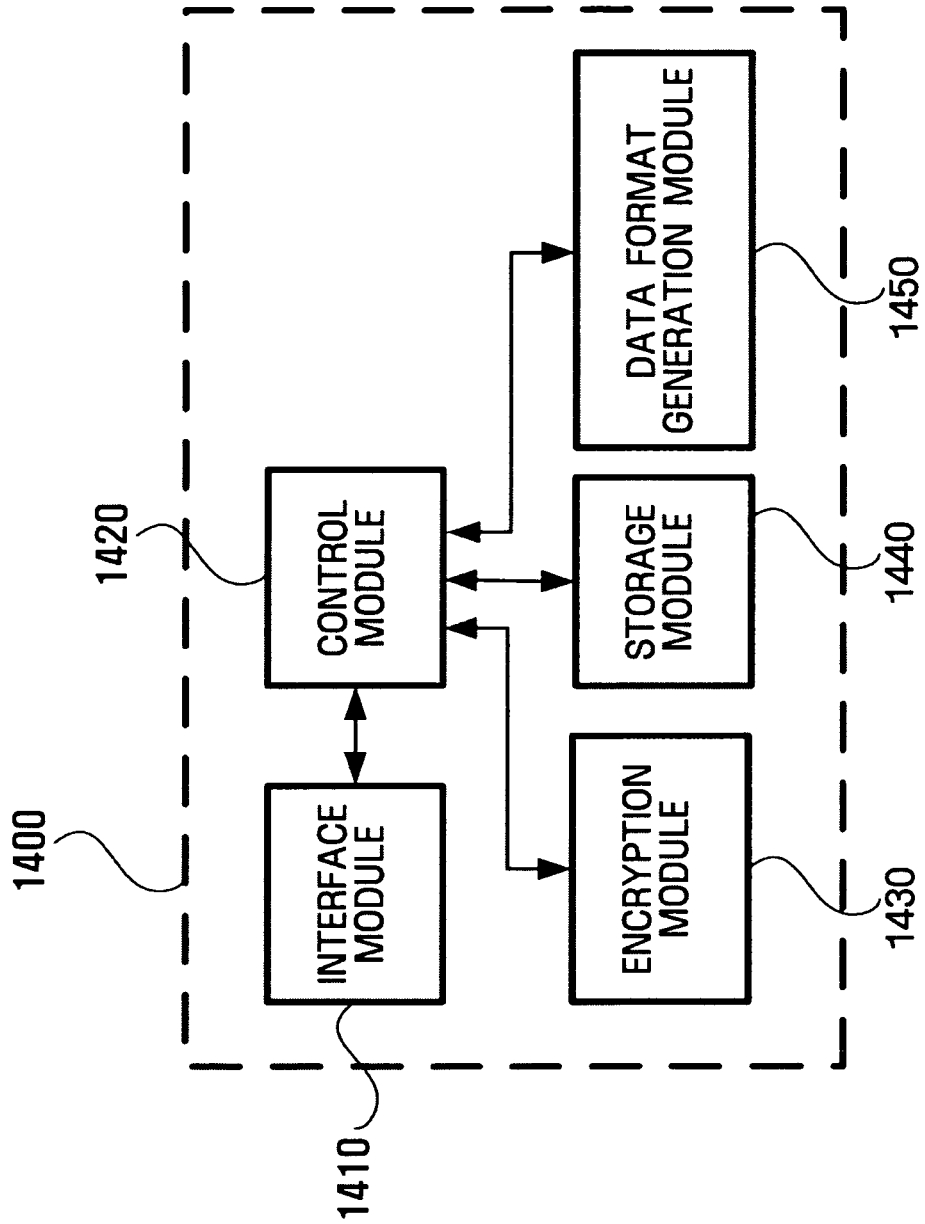
FIG. 15 is a block diagram of a portable storage according to an exemplary embodiment of the present invention.

FIG. 15 is a block diagram of a portable storage 1400 according to an exemplary embodiment of the present invention.

In the exemplary embodiments of the present invention described below, a "module" indicates a software component or a hardware component such as a field-programmable gate array (FPGA) or an application-specific integrated circuit (ASIC). The module performs a particular function. The module is not restricted to software and hardware. The module may be included in an addressable storage medium or may be configured to play one or more processors. Accordingly, modules may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by modules may be combined into a smaller number of components and a smaller number of modules, or may be divided into a greater number of components and a greater number of modules. In addition, components and modules may be implemented such that they play one or more central processing units (CPUs) in a device or an MMC.

To implement DRM, a portable storage 1400 needs a security function, a function of storing content or an RO, a function of exchanging data with a device, and a DRM function. In addition, the portable storage 1400 needs a function of generating CPSF data.

To perform these functions, the portable storage 1400 includes an encryption module 1430 having a security function, a storage module 1440 having a storage function, an interface module 1410 allowing data exchange with a device, a control module 1420 controlling each module to perform a DRM procedure, and a data format generation module 1450 generating CPSF data.

The interface module 1410 allows the portable storage 1400 to be connected with the device.

When the portable storage 1400 is connected with the device, the interface module 1410 of the portable storage 1400 may be electrically connected with an interface module of the device. However, the electrical connection is just an example, and the connection may indicate a state in which the portable storage 1400 can communicate with the device through a wireless medium without a contact.

The encryption module 1430 encrypts data to be transmitted to the device and decrypts encrypted data received from the device according to the request of the control module 1420. The encryption module 1430 may perform not only public-key encryption but also private-key encryption. To this end, one or more encryption modules may be provided.

Particularly, an RO is stored in an encrypted state. Thus, the portable storage 1400 can encrypt the RO using a unique key that cannot be read by other devices, and decrypts the RO using the unique key to allow the RO to be moved or copied to another device. The encrypting of an RO using the unique key according to the symmetric-key encryption is just an example. Alternatively, an RO may be encrypted using a private key of the portable storage 1400 and may be decrypted using a public key of the portable storage 1400 when necessary.

The storage module 1440 stores encrypted contents, a rights object, a certificate of the portable storage 1400, and a CRL.

The control module 1420 can control authentication with the device when the portable storage 1400 is connected to the device. In addition, the control module 1420 can determine whether a CPSF is needed and command the data format generation module 1450 to generate the CPSF. Here, the CPSF is needed when the portable storage 1400 receives from the device a request for permission information of a particular rights object, as described above with reference to FIG. 14, a request for playback of a particular content, a request for update of a particular rights object stored in the portable storage 1400, or the like.

In response to the command from the control module 1420, the data format generation module 1450 finds a rights object for which a CPSF is to be generated and generates a CPSF having a structure corresponding to a type of the found rights object. The structures of a CPSF have been described above with reference to FIGS. 7 through 13.

FIG. 16 is a block diagram of a device 1500 according to an exemplary embodiment of the present invention.

To implement DRM, the device 1500 needs a security function; a function of storing content, a rights object, its certificate, and a CRL; a function of exchanging data with a portable storage; a data transmit/receive function allowing communication with a contents issuer or a rights issuer; and a DRM function. To perform these functions, the device 1500 includes an encryption module 1530 having a security function, a storage module 1540 having a storage function, an interface module 1510 allowing data exchange with a portable storage, and a control module 1520 controlling each module to perform the DRM. In addition, the device 1500 includes a transceiver module 1550 for the data transmit/receive function and a display module 1560 displaying the playback status of content.

The transceiver module 1550 allows the device 1500 to communicate with the contents issuer or the rights issuer via a wired or wireless connection. The device 1500 can obtain a rights object and encrypted content from outside and a certificate and a CRL from a certification authority using the transceiver module 1550.

The interface module 1510 allows the device 1500 to be connected with a portable storage. When the device 1500 is connected with the portable storage, the interface module 1510 of the device 1500 may be electrically connected with an interface module of the portable storage. However, the electrical connection is just an example, and the connection may indicate a state in which the device 1500 can communicate with the portable storage through a wireless medium without a contact.

The encryption module 1530 encrypts data to be transmitted to the portable storage and decrypts encrypted data received from the portable storage according to the request of the control module 1520. The encryption module 1530 may perform not only public-key encryption but also private-key encryption. To this end, one or more encryption modules may be provided.

Particularly, an RO is stored in an encrypted state. Thus, the device 1500 can encrypt the RO using a unique key that cannot be read by other devices or portable storages, and decrypts the RO using the unique key to allow the RO to be moved or copied to another device or portable storage. The encrypting of an RO using the unique key according to the symmetric-key encryption is just an example. Alternatively, an RO may be encrypted using a private key of the device 1500 and may be decrypted using a public key of the device 1500 when necessary.

The storage module 1540 stores encrypted content, a rights object, a certificate of the device 1500, and a CRL.

The control module 1520 can control authentication with the portable storage when the device 1500 is connected to the portable storage. In addition, the control module 1520 can send to the portable storage a request for permission information of a particular rights object, a request for playback of a particular content, a request for update of a particular rights object stored in the portable storage, or the like, as described with reference to FIG. 14. When receiving CPSF data transmitted from the portable storage responding to the request, the control module 1520 analyzes the CPSF to acquire a CEK for the rights object or permission information of the rights object.

The display module 1560 visually displays the playback of content permitted to be played back by the rights object. The display module 1560 may be implemented as a liquid crystal display such as thin film transistor liquid crystal display (TFT LCD) or an organic electroluminescent (EL) display.

It will be understood by those of ordinary skill in the art that various changes in form and details may be made therein without departing from the spirit and scope of the present invention as defined by the following claims. Therefore, it is to be appreciated that the above described exemplary embodiments are for purposes of illustration only and not to be construed as a limitation of the invention. The scope of the invention is given by the appended claims, rather than the preceding description, and all variations and equivalents which fall within the range of the claims are intended to be embraced therein.

As described above, according to the present invention, overhead is reduced and information transmission speed is increased when rights object information is transmitted between a device and a portable storage.

What is claimed is:

1. A method of transmitting rights object information between a device and a portable storage, which is performed by the portable storage, the method comprising:

receiving a request from the device;

generating a current permission status format including information of a rights object designated by the request; and transmitting the current permission status format to the device, wherein the portable storage is at least one of a smart medium, memory stick, compact flash card, xD card, and multimedia card, wherein the request is one of a request for permission information of the rights object, a request for playback of a particular content, and a request for update of the rights object, wherein the current permission status format comprises a content ID field for a content ID identifying an encrypted content that can be played back using the rights object, a content encryption key (CEK) field for a CEK used to decrypt the encrypted content, a message digest field for a message digest value for integrity of transmitted data, and a permission information field for the permission information of the rights object, and wherein if the request received from the device is the request for the permission information of the rights object or the request for update of the rights object, the CEK field is set to a null value.

2. The method of claim 1, wherein the generating the current permission status format comprises:

finding the rights object;

determining a type of the rights object; and generating the current permission status format that includes the permission information of the rights object according to the type of the rights object.

3. The method of claim 2, wherein if the type of the rights object is a general rights object, the current permission status format comprises at least one permission information field, and the permission information field comprises type information indicating that the rights object is a general rights object, a rights object index for identifying the rights object in the portable storage, a permission index for identifying a type of permission, constraint information of the permission, and a number of constraint information items.

4. The method of claim 2, wherein if the type of the rights object is a child rights object, the permission information field comprises type information indicating that the rights object is a child rights object, a parent rights object ID for identifying a parent rights object of the child rights object, and an address indicating a position of an issuer of the child rights object.

5. The method of claim 2, wherein if the type of the rights object is a parent rights object, the permission information field comprises type information indicating that the rights object is a parent rights object, a parent rights object ID for identifying the parent rights object, a permission index for identifying a type of permission set for the rights object, constraint information of the permission, and a number of constraint information items.

6. The method of claim 2, wherein if a general rights object and a child rights object are found as the rights object, the permission information field comprises permission information of the general rights object and permission information of the child rights object.

7. The method of claim 2, wherein if a general rights object and a parent rights object are found as the rights object, the permission information field comprises permission information of the general rights object and permission information of the parent rights object.

8. The method of claim 1, wherein the current permission status format is transmitted between the device and the portable storage using an application protocol data unit comprising an encrypted send sequence counter indicating a send sequence of the application protocol data unit and encrypted data to be transmitted.

9. The method according to claim 1, wherein the rights object is a license for decoding and executing the encrypted content.

10. A method of transmitting rights object information between a device and a portable storage, which is performed by the device, the method comprising:
   transmitting a request to the portable storage; and
   receiving a current permission status format including information of a rights object designated by the request from the portable storage,
   wherein the request is one of a request for permission information of the rights object, a request for playback of a particular content, and a request for update of the rights object; and
   the current permission status format comprises a content ID field for a content ID identifying an encrypted content that can be played back using the rights object, a content encryption key (CEK) field for a CEK used to decrypt the encrypted content, a message digest field for a message digest value for checking integrity of transmitted data, and a permission information field for the permission information of the rights object,
   wherein if the request transmitted to the portable storage is the request for the permission information of the rights object or the request for update of the rights object, the CEK field is set to a null value, and
   wherein the portable storage is at least one of a smart medium, memory stick, compact flash card, xD card, and multimedia card.

11. The method of claim 10, wherein if the rights object is a general rights object, the current permission status format comprises at least one permission information field, and the permission information field comprises type information indicating that the rights object is a general rights object, a rights object index for identifying the rights object in the portable storage, a permission index for identifying a type of permission, constraint information of the permission, and a number of constraint information items.

12. The method of claim 10, wherein if the rights object is a child rights object, the permission information field comprises type information indicating that the rights object is a child rights object, a parent rights object ID for identifying a parent rights object of the child rights object, and an address indicating a position of an issuer of the child rights object.

13. The method of claim 10, wherein if the rights object is a parent rights object, the permission information field comprises type information indicating that the rights object is a parent rights object, a parent rights object ID for identifying the parent rights object, a permission index for identifying a type of permission set for the rights object, constraint information of the permission, and a number of constraint information items.

14. The method of claim 10, wherein if a general rights object and a child rights object are found as the rights object, the permission information field comprises permission information of the general rights object and permission information of the child rights object.

15. The method of claim 10, wherein if a general rights object and a parent rights object are found as the rights object, the permission information field comprises permission information of the general rights object and permission information of the parent rights object.

16. The method of claim 10, wherein the current permission status format is transmitted between the device and the portable storage using an application protocol data unit comprising an encrypted send sequence counter indicating a send sequence of the application protocol data unit and encrypted data to be transmitted.

17. The method according to claim 10, wherein the rights object is a license for decoding and executing the encrypted content.

18. A non-transitory recording medium having a computer readable program recorded therein, the program executing a method of transmitting rights object information between a device and a portable storage, which is performed by the portable storage, the method comprising:
   receiving a request from the device;
   generating a current permission status format including information of a rights object designated by the request; and
   transmitting the current permission status format to the device,
   wherein the portable storage is at least one of a smart medium, memory stick, compact flash card, xD card, and multimedia card,
   wherein the request is one of a request for permission information of the rights object, a request for playback of a particular content, and a request for update of the rights object,
   wherein the current permission status format comprises a content ID field for a content ID identifying an encrypted content that can be played back using the rights object, a content encryption key (CEK) field for a CEK used to decrypt the encrypted content, a message digest field for a message digest value for integrity of transmitted data, and a permission information field for the permission information of the rights object, and
   wherein if the request received from the device is the request for the permission information of the rights object or the request for update of the rights object, the CEK field is set to a null value.

19. The non-transitory medium according to claim 18, wherein the rights object is a license for decoding and executing the encrypted content.

20. A non-transitory recording medium having a computer readable program recorded therein, the program executing a method of transmitting rights object information between a device and a portable storage, which is performed by the device, the method comprising:
    transmitting a request to the portable storage; and
    receiving a current permission status format including information of a rights object designated by the request from the portable storage,
    wherein the request is one of a request for permission information of the rights object, a request for playback of a particular content, and a request for update of the rights object,
    wherein the current permission status format comprises a content ID field for a content ID identifying an encrypted content that can be played back using the rights object, a content encryption key (CEK) field for a CEK used to decrypt the encrypted content, a message digest field for a message digest value for checking integrity of transmitted data, and a permission information field for the permission information of the rights object,
    wherein if the request transmitted to the portable storage is the request for the permission information of the rights object or the request for update of the rights object, the CEK field is set to a null value, and
    wherein the portable storage is at least one of a smart medium, memory stick, compact flash card, xD card, and multimedia card.

21. The non-transitory medium according to claim 20, wherein the rights object is a license for decoding and executing the encrypted content.

22. A portable storage comprising:
    a processor;
    an interface module which is connectable to a device for communication;
    a storage module which stores a rights object;
    a control module implemented by the processor, which determines whether to generate a current permission status format according to a request received from the device through the interface module; and
    a data format generation module which searches the storage module to find a rights object designated by the request, and generates the current permission status format including information of the rights object according to a result of the determination performed by the control module,
    wherein the portable storage is at least one of a smart medium, memory stick, compact flash card, xD card, and multimedia card,
    wherein if the request is one of a request for permission information of the rights object, a request for playback of a particular content, and a request for update of the rights object, the control module determines to generate the current permission status format,
    wherein the current permission status format comprises a content ID field for a content ID identifying an encrypted content that can be played back using the rights object, a content encryption key (CEK) field for a CEK used to decrypt the encrypted content, a message digest field for a message digest value for integrity of transmitted data, and a permission information field for the permission information of the rights object, and
    wherein if the request received from the device is the request for the permission information of the rights object or the request for update of the rights object, the data format generation module sets the CEK field to a null value.

23. The portable storage of claim 22, wherein if the rights object is a general rights object, the current permission status format comprises at least one permission information field, and the permission information field comprises type information indicating that the rights object is a general rights object, a rights object index for identifying the rights object in the portable storage, a permission index for identifying a type of permission, constraint information of the permission, and a number of constraint information items.

24. The portable storage of claim 22, wherein if the rights object is a child rights object, and the permission information field comprises type information indicating that the rights object is a child rights object, a parent rights object ID for identifying a parent rights object of the child rights object, and an address indicating a position of an issuer of the child rights object.

25. The portable storage of claim 22, wherein if the rights object is a parent rights object, the permission information field comprises type information indicating that the rights object is a parent rights object, a parent rights object ID for identifying the parent rights object, a permission index for identifying a type of permission set for the rights object, constraint information of the permission, and a number of constraint information items.

26. The portable storage of claim 22, wherein if a general rights object and a child rights object are found as the rights object, the permission information field comprises permission information of the general rights object and permission information of the child rights object.

27. The portable storage of claim 22, wherein if a general rights object and a parent rights object are found as the rights object, the permission information field comprises permission information of the general rights object and permission information of the parent rights object.

28. The portable storage of claim 22, wherein an application protocol data unit for communication with the device connected to the interface module comprises an encrypted send sequence counter indicating a send sequence of the application protocol data unit and encrypted data to be transmitted.

29. The portable storage according to claim 22, wherein the rights object is a license for decoding and executing the encrypted content.

30. A device comprising:
    a processor;
    an interface module which is connectable to a portable storage for communication; and
    a control module, implemented by the processor, which generates a request to be transmitted to the portable storage through the interface module, and obtains information of a rights object designated by the request from a current permission status format that includes the information of the rights object and is received through the interface module in response to the request,
    wherein the portable storage is at least one of a smart medium, memory stick, compact flash card, xD card, and multimedia card,
    wherein the request is one of a request for permission information of the rights object, a request for playback of a particular content, and a request for update of the rights object, wherein the current permission status format comprises a content ID field for a content ID identifying an encrypted content that can be played back using the rights object, a content encryption key (CEK) field for a CEK used to decrypt the encrypted content, a message digest field for a message digest value for checking integrity of transmitted data, and a permission information field for the permission information of the rights object, and wherein if the request transmitted to the portable storage is the request for the permission information of the rights object or the request for update of the rights object, the CEK field is set to a null value.

31. The device of claim 30, wherein if the rights object is a general rights object, the current permission status format comprises at least one permission information field, and the permission information field comprises type information indicating that the rights object is a general rights object, a rights object index for identifying the rights object in the portable storage, a permission index for identifying a type of permission, constraint information of the permission, and a number of constraint information items.

32. The device of claim 30, wherein if the rights object is a child rights object, and the permission information field comprises type information indicating that the rights object is a child rights object, a parent rights object ID for identifying a parent rights object of the child rights object, and an address indicating a position of an issuer of the child rights object.

33. The device of claim 30, wherein if the rights object is a parent rights object, the permission information field comprises type information indicating that the rights object is a parent rights object, a parent rights object ID for identifying the parent rights object, a permission index for identifying a type of permission set for the rights object, constraint information of the permission, and a number of constraint information items.

34. The device of claim 30, wherein if a general rights object and a child rights object are found as the rights object, the permission information field comprises permission information of the general rights object and permission information of the child rights object.

35. The device of claim 30, wherein if a general rights object and a parent rights object are found as the rights object, the permission information field comprises permission information of the general rights object and permission information of the parent rights object.

36. The device of claim 30, wherein an application protocol data unit for communication with the portable storage connected to the interface module comprises an encrypted send sequence counter indicating a send sequence of the application protocol data unit and encrypted data to be transmitted.

37. The device of claim 30, wherein the rights object is a license for decoding and executing the encrypted content.

\* \* \* \* \*